United States Patent [19]

Sakata et al.

[11] Patent Number: 4,856,869

[45] Date of Patent: Aug. 15, 1989

[54] DISPLAY ELEMENT AND OBSERVATION APPARATUS HAVING THE SAME

[75] Inventors: Hajime Sakata; Yasuyuki Watanabe, both of Hiratsuka; Masato Yamanobe, Machida; Yukitoshi Ohkubo, Yokohama; Akihiro Nagano, Kawasaki, all of Japan

[73] Assignee: Canon Kabushiki Kaisha, Tokyo, Japan

[21] Appl. No.: 35,017

[22] Filed: Apr. 6, 1987

[30] Foreign Application Priority Data

| Apr. 8, 1986 [JP] | Japan | 61-81393 |
| Apr. 8, 1986 [JP] | Japan | 61-81394 |
| Apr. 10, 1986 [JP] | Japan | 61-82527 |
| Mar. 6, 1987 [JP] | Japan | 62-51630 |
| Mar. 6, 1987 [JP] | Japan | 62-51631 |
| Mar. 6, 1987 [JP] | Japan | 62-51632 |

[51] Int. Cl.$^4$ .............................................. G02B 5/18
[52] U.S. Cl. ................... 350/162.18; 350/162.24; 354/471
[58] Field of Search ............ 350/162.17, 162.18, 350/162.19, 162.24; 354/471, 474, 475, 482, 483

[56] References Cited

U.S. PATENT DOCUMENTS

| 3,917,378 | 11/1975 | Gale | 350/162.17 |
| 3,997,243 | 12/1976 | Bergen | 350/162.17 |
| 4,011,435 | 3/1977 | Phelps et al. | 350/162.17 |
| 4,045,124 | 8/1977 | Pollack et al. | 350/162.24 |
| 4,251,137 | 2/1981 | Knop et al. | 350/162.19 |
| 4,384,210 | 5/1983 | Stauffer | 350/162.17 |
| 4,389,096 | 6/1983 | Hori et al. | 350/162.17 |
| 4,397,525 | 8/1983 | Ahlen | 350/162.17 |
| 4,474,446 | 10/1984 | Reynolds et al. | 350/162.24 |

*Primary Examiner*—Bruce Y. Arnold
*Assistant Examiner*—Martin Lerner
*Attorney, Agent, or Firm*—Fitzpatrick, Cella, Harper & Scinto

[57] ABSTRACT

A display element includes a substrate and a display pattern formed on the substrate, the display pattern including a diffraction grating. The width in the direction perpendicular to the grating lines of the diffraction grating of the display pattern is selected so as to prevent re-diffraction of the light diffracted by the one diffraction grating. An observation apparatus includes the afore-said display element, but the display pattern has a first diffraction grating structure and a second diffraction grating structure. An illuminating system and an observation system are added so as to allow for observation of the display pattern. The direction of the grating lines of the first diffraction grating structure differs from that of the grating lines of the second diffraction grating structure, thereby preventing the occurrence of a rainbow-like image.

12 Claims, 9 Drawing Sheets

DISPLAY ELEMENT AND OBSERVATION APPARATUS HAVING THE SAME

BACKGROUND OF THE INVENTION

1. Field of the Invention

The present invention relates generally to a display element, and more particularly to a display element which performs optical modulation by utilizing the phenomenon of optical diffraction.

In addition, the present invention relates generally to an observation apparatus including a display apparatus having the aforesaid display element, and more particularly to an observation apparatus adapted for use in the viewfinder of a camera which enables an operator to observe the image of an object and a display pattern both of which are optically superimposed on each other.

2. Related Background Art

A typical light modulating element which has heretofore been known employs a so-called TN (twist-nematic) type liquid crystal which essentially comprises: a pair of polarizing plates arranged such that their respective directions of vibration of polarization are cross perpendicular to each other; an element disposed in the gap between the pair of polarizing plates and having a pair of optical transparent substrates in which a liquid crystal is enclosed, the facing surface of the pair of substrates being respectively subjected to orientation patterning. The liquid crystal is switched over between the state of being twisted and the state of being oriented perpendicular to the substrate surface, thereby optically modulating incident light.

Since such a display element has a simple construction and is easy to drive, this type is widely used in various fields. However, the aforesaid two polarizing plates must be used so as to transmit and cut off luminous flux, so that the transmittance of the element is inferior. It is therefore known that this type is not a suitable light modulating element from the viewpoints of the efficiency of utilization of luminous flux.

A so-called guest-host-mode liquid crystal is also known as a display element of the same type that utilizes a liquid crystal and in which liquid-crystal molecules and coloring matter are mixed together. Since this type display element includes additional coloring material, the transmittance thereof is at best about 70% even at the time of color extinction.

In addition, Japanese Patent Examined Publication No. 3932/1978 and U.S. Pat. No. 4,251,137 disclose a variable diffractive substractive color filter element and a display element formed by a combination of a liquid crystal and a reflection type or a translucent phase type diffraction grating. Since these elements disclosed in the prior art are respectively capable of utilizing luminous flux with high efficiency, they are usable for a display element incorporated in the viewfinder of a camera, a light bulb or the like.

However, the aforementioned display element utilizing the diffraction grating has the problem that multiple reflection or unwanted diffracted light is produced within a display pattern, and the thus-produced unwanted light contributes to lowering display quality.

The display element including such a light modulating element is typically disposed in the vicinity of, for example, the focal plane of the viewfinder system of a camera, and the operator might observe a high intensity object (for example, a mercury lamp) through such a viewfinder system. In this case, if the light from the high intensity object is incident upon any part of the diffraction grating portion which is displaying an image, a rainbow-like diffracted image may be formed in the remaining region of the same diffraction grating portion. This leads to a problem in that the rainbow-like image lowers the quality of the display element.

SUMMARY OF THE INVENTION

It is therefore an object of the present invention to provide a display element which enables a high quality display by preventing or reducing the occurrence of an unwanted diffraction image or a rainbow-like image formed by diffracted light such as second or higher diffracted light.

It is another object of the present invention to provide a novel observation apparatus which is equipped with a display element utilizing a diffraction grating, thereby enabling a high quality display;

It is still another object of the present invention to provide an observation apparatus suitable for use in optical devices such as the viewfinder of a camera, or the like, in which the image of an object and the display pattern produced by a display element are optically superimposed upon each other so that an operator can clearly observe the superimposed image at the same time, and yet which is superior in display quality.

To these ends, in a principal form of the present invention, the display element comprises: an optically transparent substrate; and a diffraction grating disposed on the optically transparent substrate for forming a display pattern with a substantial length in the longitudinal length, in which the direction perpendicular to the grating lines of the diffraction grating is in a non-parallel relationship with the longitudinal length direction in which the substantial length is formed.

In a specific form of the present invention, the display element comprises: the optically transparent substrate; and a first diffraction grating structure and a second diffraction grating structure both of which are disposed on the optically transparent substrate, in which the direction of the grating lines and/or the grating pitch of the first diffraction grating structure differ from that of the second diffraction grating structure.

In another specific form of the present invention, the display element comprises: the optically transparent substrate; and the first diffraction grating structure and the second diffraction grating structure both of which are disposed on the optically transparent substrate, in which the second diffraction grating structure is disposed in such a manner as to avoid a line prolonged in the direction perpendicular to the grating lines contained in the first diffraction grating structure.

In another form of the present invention, the display element comprises: the optically transparent substrate; and a diffraction grating disposed on the optically transparent substrate for forming a predetermined display pattern, in which the width of the display pattern taken in the direction perpendicular to the grating lines of the diffraction grating is determined in such a manner that the light diffracted from the substantial center in the direction of the aforesaid width of the display pattern is prevented from being totally reflected toward the interior of the substrate, thereby precluding re-incidence of the diffracted light upon the display pattern.

In another form of the present invention, the display element comprises any of the above-described forms; in which, if t represents the thickness of the optically transparent substrate, n representing the refractive index thereof and W representing the width of the display pattern taken in the direction perpendicular to the grating lines, W fulfills the following requirement:

$$W < 4 \times t \times \tan\{\sin^{-1}(1/n)\}.$$

In a further form of the present invention, the observation apparatus comprises: a display element including a first diffraction grating structure and a second diffraction grating structure, both of the first and second structures being disposed on the same substrate such that they differ from each other in respect of the direction of their respective grating lines or their respective grating pitches; an illumination system for supplying light to the display element; and an observation system used for observing the display pattern formed through diffraction of light at the aforesaid diffraction grating structures of the display element.

In another form of the present invention, the observation apparatus comprises: a transparent substrate having a thickness t and a refractive index n; a display element including a diffraction grating on the transparent substrate, which forms a display pattern having a width W taken in the direction perpendicular to the grating lines; and the illumination system for supplying light to the aforesaid display element; and the observation system for allowing for the observation of the display pattern which is formed through diffraction of light at the diffraction grating of the display element, in which the width W fulfills the following requirement:

$$W < 4 \times t \times \tan\{\sin^{-1}(1/n)\}.$$

In another form of the present invention, the observation apparatus comprises: the optically transparent substrate; the display element having the first diffraction grating structure and the second diffraction grating structure both of which are disposed on the same optically transparent substrate; the illumination system for supplying light to the display element; and the observation system used for observing the display pattern formed through diffraction of light at the diffraction grating structures, in which the first diffraction grating structure and the second diffraction grating structure are disposed in such a manner that the second structure is positioned outside an area equivalent to $\pm \theta$ degrees, which angle fulfills the following requirement:

$$|\theta| \leq \tan^{-1}\left(\frac{\sin i \cdot \sin \alpha}{\sin i \cdot \cos \alpha + k\frac{\lambda}{P}}\right)$$

$$\sin^{-1}(1/n) \leq$$

$$\cos^{-1}\left(\sqrt{n^2 - (\sin i + \sin \alpha)^2 - \left(\sin i \cdot \cos \alpha + k\frac{\lambda}{P}\right)^2}/n\right) < 90 \text{ degrees}$$

$0 \leq \alpha \leq 90$ degrees ($\alpha$ is an integer) where i represents the incident angle of the light with respect to the diffraction grating structures, $\lambda$ representing the wavelength of the incident light $\theta$ representing the azimuth from the prolonged line in the direction of the normal to the direction of the grating lines of the first diffraction grating structure, n representing the refractive index of the substrate, P representing the grating period of the first diffraction grating structure and k representing the diffraction order of the light diffracted by the first diffraction grating structure.

In another form of the present invention, the observation apparatus comprises: the first diffraction grating structure and the second diffraction grating structure both of which are disposed on the same optically transparent substrate; the illumination system for supplying light to the display element; and the observation system used for observing the display pattern formed through diffraction of light at the diffraction grating structures, in which the following requirements are fulfilled:

$$0 \leq i \leq \tan^{-1}(D_i/2L_i)$$

$$\sin^{-1}(1/n) \leq \cos^{-1}\left(\sqrt{1 - \left(\sin i + k\frac{\lambda}{p}\right)^2}/n^2\right) < \frac{\pi}{2} \text{ [rad]}$$

$$0 < \cos^{-1}\left(\sqrt{1 - \left(\frac{m}{n} \cdot \frac{\lambda}{p} \sin\theta\right)^2 - \left(\sin i + \frac{\lambda}{p}(k + m\cos\theta)\right)^2}/n^2\right) \leq \frac{\pi}{2} \text{ [rad]}$$

$$\tan^{-1}(D_o/2L_o) < \cos^{-1}\left(\sqrt{1 - \left(m\frac{\lambda}{p}\sin\theta\right)^2 - \left(\sin i + \frac{\lambda}{p}(k + m\cos\theta)\right)^2}\right)$$

here,
i; the incident light angle of the diffraction structures,
$D_i$, $D_0$; denote the pupil diameters of the illumination system and the observation system, respectively,
$L_i$; the gap between the pupil surface of the illumination system and the display element,
$L_0$; the gap between the pupil surface of the observation system and the display element,
$\lambda$; the wave length of the incident light,
p; the gratings period of the diffracting grating structures,
n; the refraction index of the transparent substrate,
$\theta$; the azimuth between the grating lines of the first diffracting grating structure and those of the second diffracting grating structure.

The direction of the grating lines of the diffraction grating in accordance with the present invention is the direction in which one of the refractive index and the reflectivity is within a continuous range thereof in the case of a phase type diffraction grating. More specifically, in the case of a phase type diffraction grating having a well-known relief pattern, the aforesaid direction corresponds to a direction in which relief line grooves are formed. In the case of an amplitude type diffraction grating, such a direction corresponds to a direction in which one of absorptance and transmittance is within a continuous range thereof while, in the case of a normal grating including normal light and dark patterns, the aforesaid direction corresponds to the direction of elongation of the fringes of one of the light and dark patterns.

In the above-described observation apparatus constituted by an illumination system including an image-focusing optical system and an observation system having a viewfinder optical system, it will be readily understood that the presently disclosed display element is suitable for use as an indicator incorporated in the viewfinder. In this case, such a display element may preferably be disposed in the vicinity of an image forming plane on which the image forming optical system forms the image of an object.

In addition, if any one of a plurality of substances forming the above-described phase type diffraction grating (typically, air in the case of the relief type) is composed of variable-refractive-index matter such as a liquid crystal, it is possible to constitute an active display element having variable transmittance with respect to zero-diffraction order light, the active display element performing functions similar to those of a variable substractive filter which has heretofore been disclosed in U.S. Pat. No. 4,251,137.

For purposes of illustration, the description in the present application deals only with the aforesaid active type display element and the observation apparatus equipped with the display element in some detail.

Further objects, features and advantages of the present invention will become apparent from the following description of preferred embodiments of the present invention with reference to the accompanying drawings.

DETAILED DESCRIPTION OF THE PREFERRED EMBODIMENTS

Figure 1:
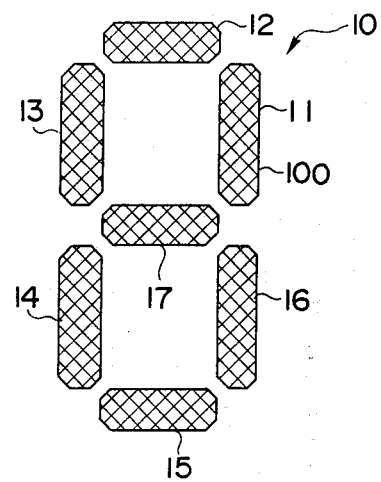
FIG. 1 is a schematic view of an example of a display element in accordance with the present invention.

FIG. 1 is a schematic view of a first preferred embodiment of the present invention. A display element constituting the first embodiment is indicated generally at 10, and its display pattern is formed by a combination of seven segments 11 to 17. A direction 100 of the diffraction gratings of each of the segments 11 to 17, that is, the direction perpendicular to that of grating line grooves is inclined from, that is, non-parallel to the longitudinal direction of each of the segments 11 to 17. In particular, the first embodiment is arranged in such a manner that the angle which is made by the direction of diffraction gratings with the longitudinal direction of each of the segments 11 to 17 is set within 45°±10°, thereby successfully achieving effects which will be described later.

Figure 2:
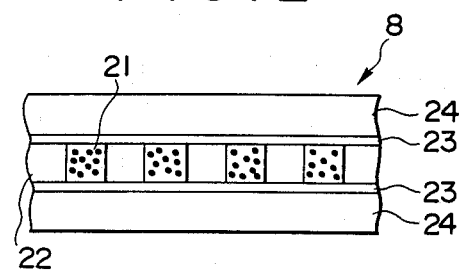
FIG. 2 is a schematic, cross-sectional view of the display element shown in FIG. 1 which is constituted by a phase type diffraction grating having a tunable phase difference, the diffraction grating being essentially formed by a combination of a liquid crystal and an optically transparent member.

Referring to FIG. 2 showing one example of the display element 10, the element 10 is formed as a phase type diffraction grating in which a liquid crystal 21 is charged as matter having a variable refractive index into the grating line grooves of a diffraction grating 22, the phase difference being varied by controlling the refractive index of the liquid crystal 21. The display element 10 further includes an optically transparent electrode 23 and an optically transparent substrate 24.

In general, when the liquid crystal 21 charged into the grating line grooves of the diffraction gratings 22 has a variable refractive index, the diffraction efficiency $\eta_O$ of a zero diffracted order light is approximately represented by the following equations:

$$\eta_0 = \frac{1}{2}\left(1 + \cos\left(2\pi \cdot \frac{\Delta n \cdot T}{\lambda}\right)\right) \quad (1)$$

$$\eta_0 = \sin C^2\left(\pi \cdot \frac{\Delta n \cdot T}{\lambda}\right) \quad (2)$$

$$\eta_0 = J_0^2\left(\pi \cdot \frac{\Delta n \cdot T}{\lambda}\right) \quad (3)$$

where $J_O$ is the Bessel function, $\Delta n$ being the difference between the refractive indices of the diffraction grating and the liquid crystal, T being the thickness of the diffraction grating, and $\lambda$ being the wavelength of the light incident on the display element.

The equations (1), (2) and (3) respectively correspond to the diffraction gratings of a rectangular shape, a triangular shape and a sinusoidal shape.

In the first preferred embodiment, the diffraction efficiency is controlled by varying the difference $\Delta n$ in refractive index, thereby performing light modulation so as to display a display pattern.

More specifically, the light polarized in the plane of rotation of the liquid crystal about its optical axis responds to an intermediate refractive index as between a normal refractive index $n_O$ of the liquid crystal and an anomalous refractive index $n_e$ of the same in accordance with the angle which is made by the optical axes of the thus-polarized light of the liquid crystal. If the effective refractive index of the liquid crystal is represented by $n_{LC}$ and the refractive index of the diffraction grating being represented by $n_g$, the difference $\Delta n$ in refractive index is $|n_{LC}-n_g|$. Therefore, light modulation such as transmission and cutoff is enabled in accordance with the efficiency of diffraction represented by the aforesaid equations (1), (2) and (3), so that a display pattern can be displayed.

In the first preferred embodiment, since the direction of the grating lines of the diffraction grating is disposed in non-parallel with the longitudinal direction of the display pattern, it is possible to prevent or reduce the deterioration of display quality due to unwanted diffracted light attributed to the multiple reflection within the display element.

Figure 3:
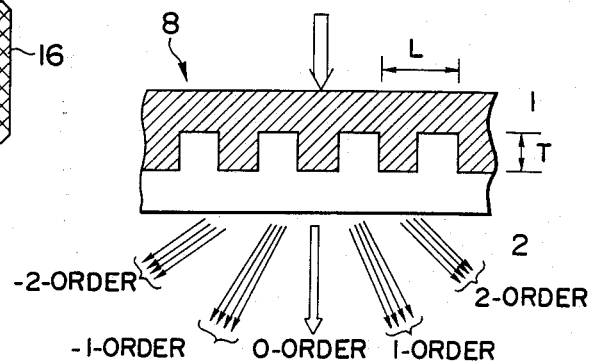
FIG. 3 is a schematic illustration of the manner of light diffracted by the display element shown in FIG. 2.

Referring illustratively to FIG. 3, in a case where light including a plurality of wavelength components is made incident upon the diffraction gratings, not only zero diffracted order light but also other diffracted order light is produced. The zero diffracted order light advances straight in the direction of entrance irrespective of the wavelength thereof, and is transmitted through the display element.

On the other hand, higher diffracted order light exit at a particular angle in accordance with its wavelength $\lambda$ and its grating coefficient. Diffracted light which is not responsible for a display operation (in the first embodiment, first or higher diffracted order light) is cut off, for example, by a so-called Schlieren optical system.

Figure 4:
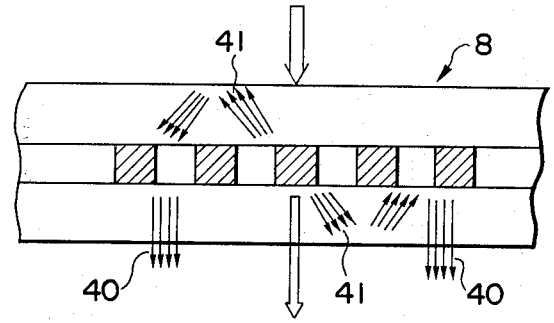
FIG. 4 is a schematic illustration used as an aid in explaining the occurrence of multiple reflection of the diffracted light and a second or higher diffracted order light within the display element shown in FIG. 2.

However, as shown in FIG. 4, after unwanted light 41 has undergone multiple reflection or unwanted multiple diffraction (inclusive of such as transmission and reflection) within the display element, the angle of exit of the unwanted light 41 coincides with that of displaying light 40 (or zero diffracted order light), so that the unwanted light 41 is not cut off and exits from the display element. In consequence, in a case where the direction of arrangement of the diffraction grating is approximately parallel to the longitudinal direction of the display pattern including such a diffraction grating, a large percentage of unwanted diffracted light appears within the display pattern, for example, in the form of a rainbow-like diffraction image.

In this manner, the unwanted diffracted light appears at a location different from the position of the display light.

The aforesaid unwanted light 41 appears in an area in which the display pattern of the diffraction grating exists. Therefore, the first preferred embodiment is arranged such that the direction of arrangement of the diffraction grating is inclined with respect to, that is, in non-parallel with the longitudinal direction of the display pattern as described previously, thereby preventing the unwanted diffracted light from appearing in an area in which the diffraction grating exits, that is, in the area of the display pattern.

In the first preferred embodiment, as described above, since the diffracted light is generated in the direction of arrangement of the diffraction grating only, even if any unwanted diffracted light is produced, the unwanted light is diffracted in the direction independent of the display pattern.

In particular, the angle which is made by the direction of arrangement of the diffraction grating with the longitudinal direction of the display pattern is set within 45°±10° (preferably, 45°±3°), thereby enabling proper elimination of the adverse influence over the display pattern exerted by the aforesaid unwanted diffracted light.

The angle is more preferably set within 45°±3°, and within this range of angle, the diffracted light does not influence the display pattern in a visual sense.

In the first embodiment, if the light incident upon the display elements 8 and 10 is light polarized in the direction of the grating line grooves of the diffraction grating or in the direction perpendicular to that direction, the diffraction grating of the display element enables, as shown in FIG. 2, light modulation with a single layer.

Figure 5:
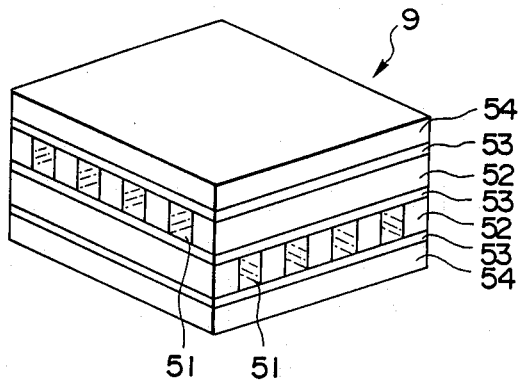
FIG. 5 is a perspective view of an example of the construction of the display element in accordance with the present invention.

FIG. 5 shows one example of the cell structure of a display element 9 in accordance with the present invention, the display element 9 being arranged in which light containing polarized components each having a different direction of vibration of polarization is made incident upon the display element 9. As shown, since the display element 9, is constituted by a two-layer structure in which one diffraction grating is disposed on the other in such a manner that they intersect perpendicular to each other in the direction in which light advances, it is possible to realize proper light modulation equivalent to that of the aforesaid single layer structure.

Reference will be made below to a concrete example of each component used in the display elements 8, 9 and 10 which constitute the first preferred embodiment in combination.

The optically transparent electrode is made of ITO (indium tin-oxide), the diffraction grating being made of a far ultraviolet photoresist ODUR 1013 (manufactured by Tokyo Ohka Sha; refractive index $n_g = 1.53$, $\lambda = 589.9$ $\mu$m), the diffraction grating having a grating thickness of 1.5 $\mu$m, a grating constant of 1.5 $\mu$m of the width of the grating line of the diffraction grating and the grating constant being 0.6. The liquid crystal is RO - TN -403 (manufactured by Rosch), the normal refractive index $n_0$ being $n_0 = 1.53$ ($\lambda = 589.3$ $\mu$m) with the anomalous refractive index $n_e = 1.78$ ($\lambda = 589.3$ $\mu$m).

In a case where no electric field is applied to the liquid crystal of the display element 10 having the aforesaid construction, that is, in the state of homogeneous orientation of the liquid crystal, the light incident on the liquid crystal responds to the anomalous refractive index $n_e$, so that the zero diffracted order light is blue.

On the other hand, in a case where the orientation of the liquid crystal molecules is made parallel to the optical axis of the incident light by an electric field applied to the liquid crystal, that is, in the state of homeotropic orientation of the liquid crystal, the light incident on the liquid crystal responds to the normal refractive index $n_0$, so that the incident light is not diffracted owing to its conformity with the refractive index $n_g$ of the diffraction grating. In consequence, the liquid crystal assumes an optically transparent state.

In the aforesaid state of display, no deterioration of display quality due to the unwanted light within the display element is to be found.

In addition, the diffraction grating may be made of $ZrO_2$ (zirconium oxide), and the liquid crystal may be RO - TN -407 (manufactured by Roshu). The grating thickness is 1.6 $\mu$m, the grating constant being 3 $\mu$m, and the ratio of the width of the grating line of the diffraction grating and the grating constant being 0.6. In this case as well, in the same manner as described above, light modulation is properly performed in response to the presence and absence of an electric field applied to the liquid crystal, thereby achieving a high quality display element without suffering from adverse influence due to the unwanted light.

In the first preferred embodiment, since the orientation of the diffraction grating is nonparallel with the longitudinal direction of the display pattern of each segment, when a display pattern is displayed through the diffraction grating, it is possible to eliminate from the display pattern portion the unwanted light produced in the display element while the efficiency of light energy is improved. This makes it possible to achieve a display element which can be clearly observed by the operator.

As explained above, incident light is diffracted into higher order by the diffraction grating, the higher diffracted order light being internally reflected from the substrate which forms part of the display element (typically the boundary made with air), again made incident upon the diffraction grating in which the light is diffracted by the diffraction grating, thus resulting in the aforesaid unwanted diffracted light. The above-described first preferred embodiment is arranged to reduce the occurrence of the unwanted diffracted light.

As shown in FIG. 3, in a case where light containing a plurality of wavelength components are incident upon the display element, not only zero diffracted order light but also light diffracted into higher orders such as ±1 diffracted order and ±2 diffracted order. Simultaneously, when the light diffracted into the respective orders exits from the display element, the outgoing light of each wavelength component forms a spectrum. It is to be noted that the zero diffracted order transmitted light advances irrespective of the wavelength thereof, exiting from the display element in the direction in which the incident light advances while other higher diffracted order light exits in the direction dependent on the wavelength $\lambda$ and the value of a pitch $\Lambda$ being the grating constant.

Therefore, in a case where the zero diffracted order light is used as modulated light for the purpose of being applied to the display element incorporated in the viewfinder of a camera, the aforesaid diffracted light which has been separated into the respective wavelengths is appears rainbow-like through the observation system in the viewfinder, and this causes the deterioration of the display quality. In order to solve the problem, in a second preferred embodiment which will be described later, when the diffraction grating of an element such as that shown in FIG. 2 is applied to a display element, such a diffraction grating is constituted by a combination of a plurality of diffraction grating structures within a display area, the respective orientations of the grating lines of the diffraction grating structures being random. This arrangement makes random the direction of exit of the aforesaid rainbow-like unwanted diffracted light which might cause deterioration of display quality, so that the unwanted diffracted waves are superimposed on one another, thereby suppressing the occurrence of the rainbow-like image in a visual sense. Accordingly, unlike the prior art, the quality of a display image can be improved by adjusting the characteristics of a display element alone without the need to either any special optical system or cutoff means, such as a mask. For this reason, the freedom of selection of an optical device to which the present display element is applicable is greatly enlarged as compared with that of the prior art.

In addition, the grating shapes, the pitches Λ and the hights T of the respective diffraction grating structures are preferably selected to be substantially equal to each other, so as to make approximately uniform the characteristics of the zero diffracted order transmitted light which is modulated light, so that the display quality is suitably maintained.

Figure 6:
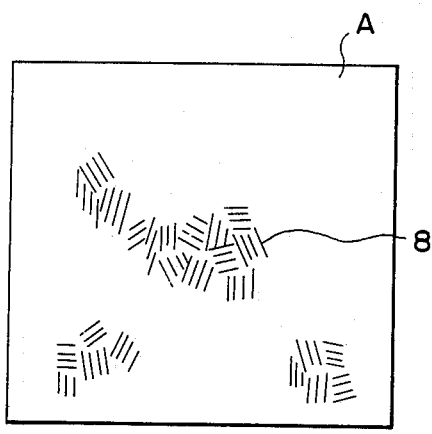
FIG. 6 is a schematic illustration of a second preferred embodiment of the display element in accordance with the present invention and showing a case wherein a plurality of diffraction gratings are disposed so that the respective directions of the grating lines thereof may differ from one another.
Figure 7:
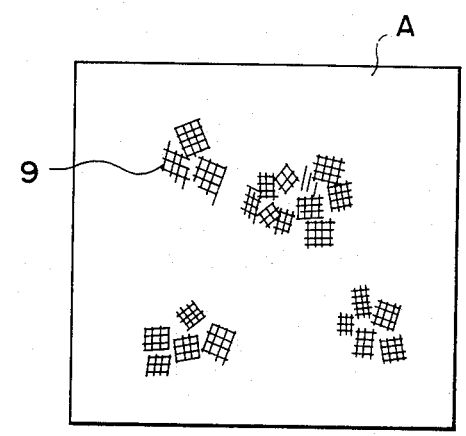
FIG. 7 is a schematic illustration similar to FIG. 6, but showing a modification thereof.

FIGS. 6 and 7 are respectively schematic views of display elements in which the light modulating portions 8 and 9 shown in FIGS. 2 and 5 are disposed in a random manner. As shown, the light modulating portions 8 and 9 are respectively disposed at a random manner, for example, within a predetermined display pattern area A so that the orientations of the diffraction gratings which constitute the light modulating portions 8 and 9 may differ from each other. Incidentally, the light modulating portions 8 and 9 are respectively constituted by the display elements shown in FIGS. 2 and 5.

The following description deals with an example of production of a display element, such as that shown in FIG. 6, and the results of evaluation of the characteristics. A first example of the invention will now be explained.

ITO optically transparent electrodes were respectively formed on a pair of glass substrates. After a far ultraviolet photoresist ODUR1013 (manufactured by Tokyo Ohka Sha) was used to form a diffraction grating on one of the glass substrates, the pair of glass substrates were bonded to each other with the ITO optically transparent electrodes facing each other. Then, a positive dielectric type nematic crystal liquid RO-TN 403 (manufactured by Roshu) was filled into the space therebetween, thereby forming a display element. During this time, when the aforesaid diffraction grating is to be formed by exposing the far ultraviolet photoresist to light, the exposure is preferably performed through a mask having a predetermined pattern so that the diffraction grating structure having a random orientation may be formed within the display pattern area. The diffraction grating of the preferred embodiment has a rectangular shape with the thickness being 1.5 μm, the pitch being 1.5 μm, and the ratio of the pitch and the width of each line of the grating (width of each convex portion) being 0.6. In addition, RO-403 exhibits a normal refractive index $n_o$ of 1.53 and an anomalous refractive index $n_e$ of 1.78 with respect to light of a 589.3 μm wavelength. With respect to the light of the same wavelength, ODUR1013 exhibits a refractive index $n_g$ of 1.53.

Since RO-TN403 is oriented in the direction of the grating line grooves of the respective diffraction gratings in a static state with an electric filed off, white light linearly polarized parallel with the line grooves of the diffraction gratings was made incident on RO-TN 403. The incident light responded to the anomalous refractive index $n_e$ of RO-TN 40, so that the zero diffracted order transmitted light exited in blue. When the orientation of RO-TN 403 was made to agree with the direction of the electric field, the incident light responded to the normal refractive index $n_o$ of RO-TN 403. Since $n_o = n_g$ as described above, the incident light completely passes through the display element, thereby providing the optically transparent state of the element. During this time, a second or higher diffracted order light other than the zero diffracted order light which is the modulated light exits from the respective diffraction grating structures. However, since the plurality of diffraction grating structures are disposed in a random manner, the higher diffracted order light exiting from the respective diffraction grating structures are intermingled with each other, so that neither rainbow-like image nor diffraction image are not substantially observed.

Accordingly, such a display element is advantageous in that the efficiency of light energy is high, light in a desired color is made to exit from the display element, thereby enabling achievement of high quality display.

Another example will be described below.

The same ITO optically transparent electrodes as those of the aforesaid example were respectively formed on a pair of glass substrates. After $ZrO_2$ was used to form a diffraction grating on one of the glass substrates by ion etching, the pair of glass substrates were bonded to each other with the optically transparent electrode surfaces facing each other. Then, a positive dielectric type nematic crystal liquid RO-TN 403 (manufactured by Roshu) was filled into the space therebetween, thereby forming a display element. As a matter of course, in this example as well, a plurality of diffraction grating structures are disposed in a random manner. The thicknesses of the respective diffraction gratings are 1.5 μm, the pitches being 1.5 μm, and the ratios of the pitch and the width of each line of the grating being 0.6. In addition, RO-TN407 exhibits a normal refractive index $n_o$ of 1.53 and an anomalous refractive index $n_e$ of 1.79, respectively, with respect to light of a 580 nm wavelength. With respect to the light of the same wavelength, $ZrO_2$ exhibits a refractive index $n_g$ of 1.53.

The same light as that used in the aforesaid example was made incident on the display element for the purpose of optical modulation. In a static state, zero diffracted order transmitted light exhibited magenta while the zero diffracted order transmitted light exhibited cyan in a state wherein a predetermined amount of electric field was applied to RO-TN407 so as to orient RO-TN407 in the direction of the electric field. In addition, at an intermediate state between the aforesaid two states (RO-TN 407 was oriented in an inclined manner), the transmitted light exhibited yellow.

As described above, use of the display element constituting the preferred embodiment enables selection between C, M and Y transmitted light through application of an electric field, and this forms a tunable color filter. Similar to the previously described embodiment, neither a rainbow-like image nor a diffracted image was observed when using such a display element.

It is to be noted that, while the above description deals only with a liquid crystal as a substance having a variable refractive index by way of example, the present invention is applicable to other kinds of substance having a variable refractive index. For example, it may be one selected from the group consisting of PLZT, LiNbO$_3$, LiTaO$_3$, TiO$_2$, PMMA, CCl$_4$, KDP, ADP, ZnO, BaTiO$_3$, Bi$_{12}$SiO$_{20}$, Ba$_2$NaNb$_5$O$_{15}$, MnBi, EuO, CS$_2$, Gd$_2$(MoO$_4$)$_3$, Bi$_4$Ti$_3$O$_{12}$, CuCl, CaAs, ZnTe, As$_2$Se$_3$, Se, AsGeSeS, DKPD, MNA, mNA, UREA, and other photoresists. However, a liquid crystal, in particular, a nematic crystal liquid can be easily obtained and controlled, and in addition the orientation can be limited through the diffraction grating. It is therefore believed that the nematic liquid crystal is suitable for use with the present invention. The use of an electric field control system is preferable from the viewpoints of response characteristics and easiness when the display element is driven. In addition, it is preferable to use a substance having a tunable refractive index in which a large difference in refractive index exists between the anomalous refractive index $n_e$ and the normal refractive index $n_o$, and use of such a substance improves the freedom of selection of element arrangement and modulation functions. Therefore, liquid crystals are suitable in this sense as well, and it is thus recommended to utilize a liquid crystal having a difference in refractive index $(n_e - n_o)$ of 0.2 or greater. Also, the aforesaid diffraction grating is produced by any one of the following methods: a method based on a combination of photolithography and dry etching; a replica method based on use of thermosetting resin, ultraviolet setting resin or the like; a cutting method based on use of a ruling engine; an embossing method; and other methods.

As described above, the display element constituting the embodiment of the present invention is disposed in such a manner that the respective orientations of the grating lines of a plurality of the diffraction grating structures are random. In consequence, rainbow-like images and diffraction images attributed to the presence of the aforesaid unwanted diffracted light are eliminated in a visual sense, so that it is possible to obtain display elements featuring the enhanced efficiency of light utilization and high quality display.

Figure 8:
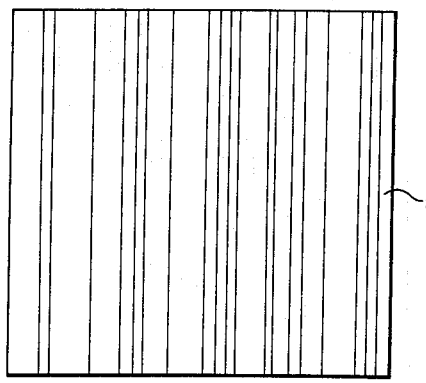
FIG. 8 is a schematic illustration of a third preferred embodiment of the display element in accordance with the present invention and showing a case wherein a plurality of diffraction gratings are disposed so that the respective grating pitches may differ from each other.
Figure 9:
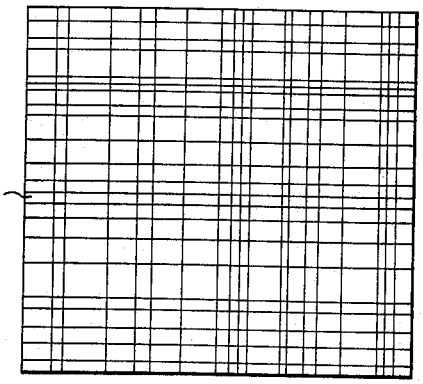
FIG. 9 is a schematic illustration similar to FIG. 8, but showing a modification thereof.

FIGS. 8 and 9 are schematic views respectively showing the states of diffraction grating formed on the display element constituting the second preferred embodiment of the present invention. For example, the grating lines of the diffraction grating are arranged at a random pitch within a predetermined display pattern area.

In the second preferred embodiment, when the diffraction grating as shown in FIG. 2 is to be applied to display elements, such a diffraction grating is formed by a combination of a plurality of diffraction grating structures within a predetermined display area, the grating pitch $\Lambda$ of the grating lines of the respective diffraction grating structures being random. This arrangement makes random the direction of exit of the aforesaid rainbow-like unwanted diffracted light which might cause the deterioration of display quality, so that the unwanted diffracted waves are optically superimposed on one another, thereby reducing the occurrence of the rainbow-like image in a visual sense. Accordingly, unlike the prior art, the quality of a display image can be improved by adjusting the characteristics of the display element alone without the need to use either any special optical system or cutoff means such as a mask. For this reason, the freedom of selection of an optical device to which the present display element is applicable is greatly enlarged as compared with that of the prior art.

In addition, the grating shapes and the heights T of the respective diffraction grating structures are preferably selected to be substantially equal to each other, so as to make approximately uniform the characteristics of the zero diffracted order transmitted light which is modulated light, so that the display quality is suitably maintained.

The display elements shown in FIGS. 8 and 9 were experimentally prepared in the same manner as in the case of FIG. 6, by using a predetermined mask so that a plurality of diffraction grating structures may be formed at a random grating pitch within the display pattern area, and the characteristics of the display elements thus obtained were evaluated.

In consequence, since the higher diffracted order waves exiting from the plurality of diffraction gratings each having a different pitch were optically mixed together, neither a rainbow-like image nor a diffraction image was found in a substantial sense.

As described above, the display element constituting the second embodiment of the present invention is disposed in such a manner that the plurality of diffraction grating structures are arranged in such a manner that the respective grating pitches are random. In consequence, rainbow-like images and diffraction images attributed to the presence of the aforesaid unwanted diffracted light are eliminated in a visual sense, so that it is possible to obtain display elements featuring the enhanced efficiency of light utilization and high quality display.

Also, in the second preferred embodiment of a display element, various kinds of matter having variable refractive index may be used instead of a liquid crystal in the same manner as the previously described first embodiment.

Referring back to FIG. 1, there is shown a concrete example of the construction of a display element including a plurality of diffraction grating structures in which the orientations or grating pitches of the respective gratings differ from each other.

Specifically, the previously described effects may be achieved by modifying the orientation of the grating lines and the grating pitches of the diffraction gratings which form the respective segments 11 to 17. Furthermore, in order to enjoy the aforementioned effects, each of the segments 11 to 17 could be constituted by a plurality of diffraction grating structures with the orientation of the grating lines and the grating pitches of the respective diffraction gratings differing from each other.

The above descriptions of the respective preferred embodiments deal with a transmission type light modulating element by way of example. As another example, it is possible to employ a reflection type light modulating element in which a light reflecting film is deposited on one of the substrates. However, in the case of the reflection type, the behaviors of the diffracted light within the element is complicated. Therefore, when consideration is given to the design and practical application of display elements, it is recommended to employ the transmission type light modulating element in the present invention. In this case, as a matter of course, the diffraction gratings, the matter having variable refractive index, the substrate and the like are preferably constituted by a material having transmittance with respect to the wavelength employed.

The above description of the respective preferred embodiments also refers to the display element which enables various states of display by modifying the refractive index of the variable-refractive-index substance through a combination of the diffraction grating and the variable-refractive index substance.

However, the present invention is not confined solely to the above-described display element. For example, the same effect can be achieved in the case of display elements which utilizes only the phenomenon of diffraction of the diffraction grating employed.

Figure 10:
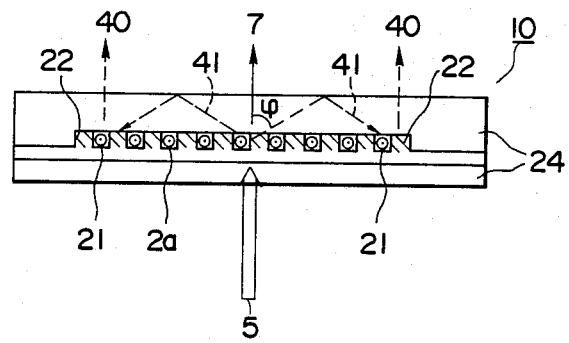
FIG. 10 is a schematic illustration used as an aid in explaining the manner of zero or higher order light diffracted by a diffraction grating formed with a display pattern having a specific pattern width.

FIG. 10 is a schematic view used for explaining the main cause which might degrade the characteristics of a display element such as that shown in FIG. 2. In this case, the display element is disposed in the vicinity of the focal plane of the viewfinder (see FIG. 11) of a photographic camera. When the operator observes a high intensity object in the viewfinder system, a rainbow-like diffraction image is formed in the display area, that is, a diffraction grating line portion the representative one of which is indicated at 2a, and this forms the main cause of such degradation.

In FIG. 10, like reference numerals are used to denote like or corresponding constituent elements which are shown in FIG. 2. Although an optically transparent electrode is actually disposed in the gap between an optically transparent substrate 24 and a diffraction grating 22, the transparent electrode is far thinner than the optically transparent substrate 24. Therefore, the illustration of such a transparent electrode is omitted.

Referring to FIG. 10, light 5 is incident upon the diffraction grating line portion 2a of the diffraction grating 22, and is optically modulated by the difference between the refractive indices of the liquid crystal 21 and the diffraction grating 22. In consequence, the incident light 5 is diffracted into a plurality of diffracted orders in a plane normal to the direction of the grating lines of the diffraction grating 22. Among such diffracted waves, diffracted light 7 such as zero or relatively low order with a relatively small angle of diffraction (for example, zero diffracted order light) directly passes through the transparent substrate 24. However, a portion of relatively high diffracted order light may be incident upon the boundary of the transparent substrate 24 and air at an angle of $\psi$, totally reflected therefrom, and being again incident upon the diffraction grating line portion 2a. When the light is again incident upon the diffraction grating portion 2a, the incident light is further diffracted therefrom. A portion of the further diffracted light indicated at 40 exits from the transparent substrate 24 at a certain angle of diffraction. If the light 40 enters the entrance pupil of the observation system, it is recognized as an image. In this case, the angle of diffraction depends on wavelengths and thus the position of re-incidence upon the diffraction grating line portion 2a also depends on wavelengths, so that the dislocation of the re-incident position is recognized as a rainbow-like image.

Specifically, when the incident light 5 is made incident upon the substantial center of the diffraction grating line portion 2a, the incident light 5 is diffracted into various orders. Thereafter, a portion of the diffracted light is totally reflected from another surface having no diffraction grating line portion 2a, that is, a surface of the transparent substrate 24 adjacent to air. Subsequently, the totally reflected light might be re-incident upon another area of the diffraction grating line portion 2a. Therefore, in the second preferred embodiment, the width in the direction normal to the grating lines of the diffraction grating line portion 2a is determined so that the totally reflected light may not be incident upon another area of the diffraction grating line portion 2a, thereby preventing the occurrence of a rainbow-like diffracted image at the diffraction grating line portion 2a.

FIG. 10 depicts transmitted diffracted light by way of example, but the same description is applied to reflected diffracted light.

Figure 11:
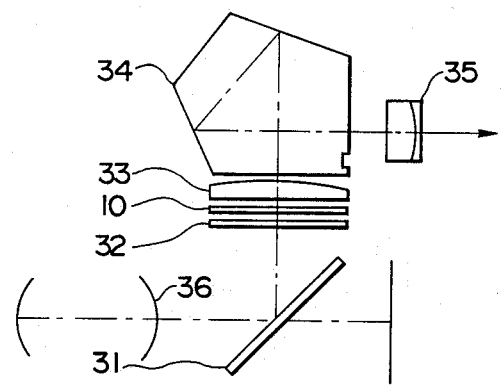
FIG. 11 is a schematic illustration of one form of an observation apparatus in accordance with the present invention and showing the viewfinder of a photographic camera.

FIG. 11 is a schematic view of an example of the viewfinder system of a photographic camera which incorporates the display element 10 in accordance with the present invention. The viewfinder system shown in FIG. 11 comprises the display element 10, a quick return mirror (half mirror) 31, a focusing screen 32, a condenser lens 33, a pentaprism 34, an eyepiece lens 35 and an image forming optical system 36.

In operation, the light transmitted through the image forming optical system 36 is introduced into the optical system of the viewfinder by the quick return mirror 31, and is focused on the focal plane of the focusing screen 32. The light passing through the focusing screen 32 is diffused at an intensity corresponding to the F-number of the photographic lens employed and the diffusion characteristics of the focusing screen 32. A portion of the diffused light reaches the eye of the operator via the condenser lens 33, the pentaprism 34 and the eyepiece lens 35. The light which is actually incident on the operator's eye is limited by the pupil diameter of the eye. For example, in the case of a typical single-lens reflex camera, the light received by the eye is normally the light which passes through the focusing screen 32 at an angular aperture of about 3° from the optical axis.

In the example shown in FIG. 11, the display element 10 is disposed in the vicinity of the focal plane of the focusing screen 32, and either a display state or a non-display state is selected by means of a driver unit (not shown). When the non-display state is selected, the display element 10 serves as an optically transparent substrate having a uniform refractive index all over the surface thereof. Therefore, the image of an object focused on the focal plane is not optically modulated, and is formed on the eye's retina via the condenser lens 33 and the pentaprism 34 and the eyepiece lens 35 in the original form. On the other hand, when the display state is selected, a portion of the light incident on the display element 10 is diffracted by the display pattern portion constituted by the diffraction grating line portion. Among the diffracted light, the component of a larger angle of diffraction is sent out of the visual field of the operator's eye. Therefore, the operator visually feels that a portion of the light from an object is substracted, so that the display pattern is optically superimposed on the image of an object.

Figure 12:
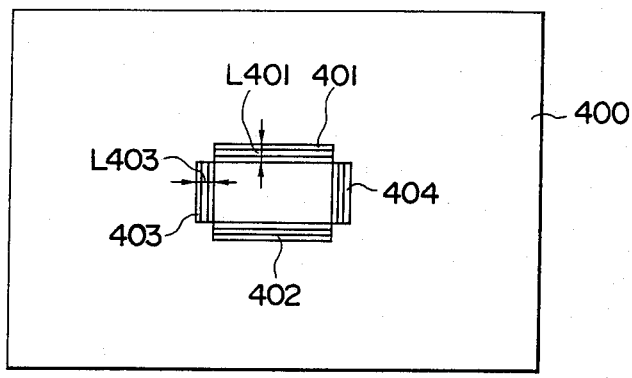
FIG. 12 is a top plan view of one example of the display element incorporated into the observation apparatus shown in FIG. 11.

FIG. 12 shows one example of the display element 10 which is used in the viewfinder system shown in FIG. 11.

The display element of FIG. 12 includes diffraction grating portions 401, 402, 403 and 404, and the respective widths in the direction normal to the grating lines of the diffraction grating portions 401 and 403 are indicated at L401 and L403. The directions of the grating lines of the respective diffraction grating portions are parallel with the longitudinal directions of the respective areas of associated display patterns.

The display element 10 shown in FIG. 12 is disposed in the vicinity of the focal plane of the viewfinder system shown in FIG. 11 and optical modulation is performed by means of the display element 10. By so doing, the diffraction grating portions 401, 402, 403 and 404 in combination form a rectangular dark image which can be observed by the operator. The display element 10 functions in this manner.

Figure 13:
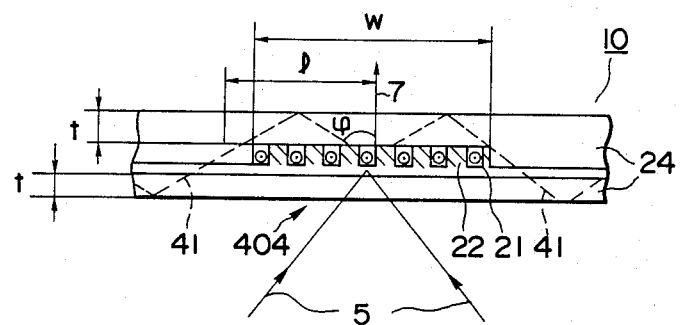
FIG. 13 is a schematic illustration used as an aid in explaining the manner of a zero or higher order light diffracted by a diffraction grating which forms the display element shown in FIG. 12.

FIG. 13 shows, in section, the state of diffraction of the light incident on a portion of the diffraction grating portion 404 of the display element shown in FIG. 12. In FIG. 13, like reference numerals are used to denote like or corresponding constituent elements shown in FIG. 10. Although an optically transparent but extremely thin electrode is disposed in the gap between the optically transparent substrate 24 and the diffraction grating 22 in an actual arrangement, such an electrode is not shown in the same manner as in the case of FIG. 10.

In FIG. 13, t is the thickness of the optically transparent substrate 24, w being the width in the direction normal to the grating lines of the diffraction grating portion 404, $\phi$ being the angle of diffraction of diffracted light within a medium (the transparent substrate 24) and $\phi$ being the distance from the incidence position of the incident light 5 to the position of an image of re-diffracted light, i.e., the position at which a rainbow-like image is formed.

The incident light 5 which is incident on the display element 10 is diffracted into a plurality of orders by virtue of the difference in refractive index as between the liquid crystal 21 and the diffraction grating 22, and thus a plurality of diffracted order waves are produced in the plane normal to the direction of the grating lines of the diffraction grating 22. If the angle of diffraction $\phi$ of the diffracted light fulfills the total-reflection requirement (n·sin $\phi > 1$: n is the refractive index of the transparent substrate 24) at the boundary of the transparent substrate 4 and air, the diffracted light is totally reflected, and is again made incident on the diffraction grating portion 22 in which it is diffracted the second time. In consequence, a rainbow-like diffraction image is formed in the area concerned. In this case, the position of generation of the rainbow-like diffraction image is determined on the basis of the values of the angle of diffraction $\phi$ and the thickness t of the transparent substrate 24. If these symbols are used, we have:

$$\approx 2 \cdot t \cdot \tan \phi$$

In this case, if no diffraction grating portion exits at a position equivalent to the distance l in the direction in which the diffracted light is totally reflected, no rainbow-like diffracted image is produced. More specifically, it is preferable that the width in the direction normal to the grating lines of the diffraction grating portion 22, that is, the width of the display pattern is smaller than the distance as between the incidence position of the incident light and the position at which the rainbow-like diffraction image appears closest to such an incidence position.

In the case of a photographic camera, since the display element 10 is typically disposed in the vicinity of the focal plane of the optical system of the viewfinder of the camera, the angle of incidence of the incident light 5 is determined depending on the selected F number of a photographic lens and the diffusion characteristics of a mat used in the viewfinder. Therefore, the light diffracted by the diffraction grating 22 also has a continuous angle of diffraction $\theta_1$. Among these diffracted waves, the minimum angle of diffraction $\phi_0$ of the light which is totally reflected by the boundary of the transparent substrate 24 and air is:

$$\phi_0 = \sin^{-1}(1/n)$$

In this case, the distance l between the incidence position of the incident light 5 and the position of generation of the diffraction image is:

$$l = 2 \times t \times \tan(\sin^{-1}(1/n)) \quad (4)$$

In an actual case where a high intensity spot of light from an object is made incident on the display pattern, the light incident on the vicinity of the center in the direction of the width of the display pattern may frequently causes a rainbow-like diffraction image at the edge of the display pattern. For this reason, it is preferable to determine the width of the display pattern so that the occurrence of the rainbow-like image may be prevented in this case as well. Accordingly, in order to reduce the occurrence of the rainbow-like diffraction image, the width of the display pattern, i.e., the width w in the direction normal to the grating lines of the diffraction grating portion 22 is preferably set to fulfill the requirement:

$$w < 4 \times t \times \tan(\sin^{-1}(1/n)) \quad (5)$$

Figure 16:
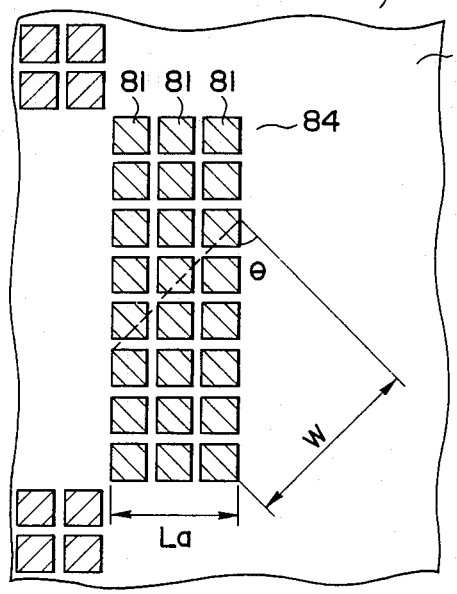
FIG. 16 is a partially enlarged view similar to FIG. 15 of the diffraction g rating of the display element shown in FIG. 14 similar to FIG. 15 but showing a particular group of the diffraction gratings which are further formed by a plurality of diffraction grating portions.

For example, if the display element 10 shown in FIG. 16 includes a glass substrate having a refractive index n of 1.53 and a thickness t of 0.5 mm, the width w of the display pattern 10 may preferably fulfill the requirement:

$$w < 1.73 \text{ (mm)}$$

The display element 10 is constructed such that the liquid crystal 21 and the diffraction grating 22 are sandwiched between the two transparent substrates 24. If the a thicknesses of these transparent substrates 24 differ from each other, the display element may be designed with reference to the thickness t of the thinner one of the two.

Figure 14:
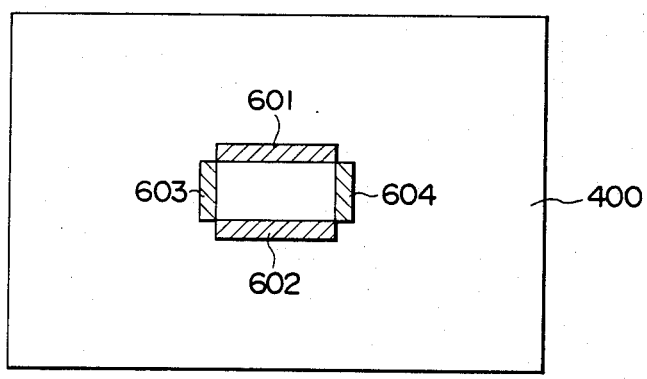
FIG. 14 is a top plan view of another example of the display element incorporated into the observation apparatus shown in FIG. 11.

FIG. 14 shows another example of the display element incorporated in observation apparatuses such as the viewfinder shown in FIG. 11, and is a top plan view of a modified form of the display element 10 shown in FIG. 12. The display element indicated generally at 10 includes an optically transparent substrate 400 and diffraction grating portions 601, 602, 603 and 604. The directions of the grating lines of the respective diffraction grating portions 601, 602, 603 and 604 are represented by slanting lines.

Figure 15:
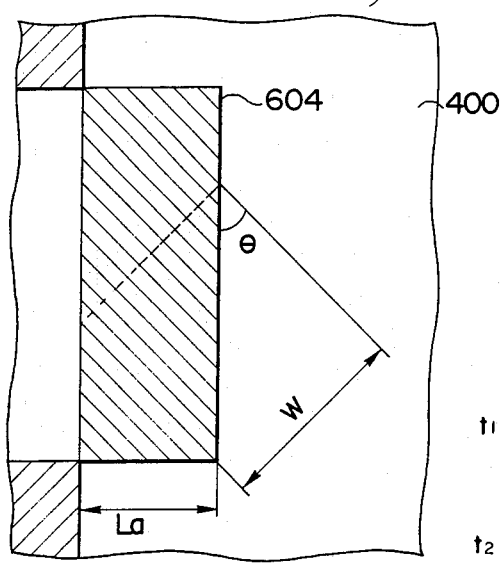
FIG. 15 is a partially enlarged view of the diffraction grating of the display element shown in FIG. 14.

In this modified form, the respective directions of the grating lines of the diffraction grating portions 601, 602, 603 and 604 make fixed angles with the longitudinal directions of the display patterns formed by the diffraction grating portions FIG. 15 is an enlarged view of the diffraction grating portion 604 of the display element 10 shown in FIG. 14. In FIG. 15, $\theta$ is the angle (azimuth) which is made by the direction of the grating lines with the longitudinal direction of the diffraction grating portion 604, La being the width of the diffraction grating portion 604 and w being the width taken in the direction normal to the grating lines of the diffraction grating portion 604.

In the operation of this modified form, when light is made incident on the diffraction grating portion 604, the incident light is diffracted by the difference in refractive index as between a liquid crystal (not shown) and the diffraction gratings, so that the incident light is diffracted into a plurality of orders in the plane normal to the direction of the grating lines of the diffraction grating. Among the diffracted waves, the high diffracted order light having a large angle of diffraction is totally reflected by the boundary of the transparent substrate 400 and air. However, if the diffraction grating portion 604 is absent in the direction in which the totally reflected waves advance, the waves are re-diffracted, and thus no rainbow-like diffraction image is produced.

The distance L between: the incidence position of the light incident on the diffraction grating portion 604; and a position at which the diffraction image appears due to re-diffraction is:

$$L = 2 \times t \times \tan^{-1}(\sin^{-1}(1/n)) \quad (6)$$

where the symbols used are the same as the aforesaid symbols.

Therefore, if the width w in the direction normal to the grating lines is set to w<L, it is possible to completely prevent the occurrence of the rainbow-like diffraction image, but w<L is not critical in an actual arrangement. For the previously described reason, if the width w is set so as to fulfill the following requirement, the occurrence of the rainbow-like diffraction image is substantially prevented:

$$w < 2L = 4 \times t \times \tan^{-1}(\sin^{-1}(1/n)) \quad (7)$$

For example, in the same manner as the previously-described form, if the display element 10 incorporates a glass substrate having a refractive index n of 1.53 and a thickness t of 0.5 mm with an angle $\theta$ of 45°, the width La of the display pattern is preferably set so as to fulfill the requirement:

$$La < 1.22 \text{ (mm)}$$

If this modified form of the display element 10 is incorporated into the viewfinder system shown in FIG. 11, the operator can observe, in the visual field of the viewfinder, the optical image of an object and at the same time a dark rectangular image which is formed by the diffraction grating portions 601, 602, 603 and 604. The display element 10 functions in this manner.

Referring to FIG. 16 showing another modified form, w represents the width in the direction normal to the grating lines, $\theta$ representing the angle which is made by the direction of the grating lines with the longitudinal direction of the diffraction grating portion 84 and La representing the width of the grating portion 84. These conditions are substantially the same as those shown in FIG. 15 from the optical viewpoints.

The conditions used for preventing the occurrence of a rainbow-like diffraction image are the same as those used in the description of FIG. 15, that is, they are preferably set so as to fulfill the expression (5).

The above description as to the respective modified forms refers illustratively to the display element having an arrangement in which the diffraction grating and the liquid crystal are sandwiched between a pair of optically transparent substrates. However, even when a phase type diffraction grating containing no liquid crystal is used as a display element, it is possible to achieve completely the same effect, that is, the occurrence of a rainbow-like diffraction image can be substantially prevented by limiting the width in the direction normal to the grating lines.

Figure 17:
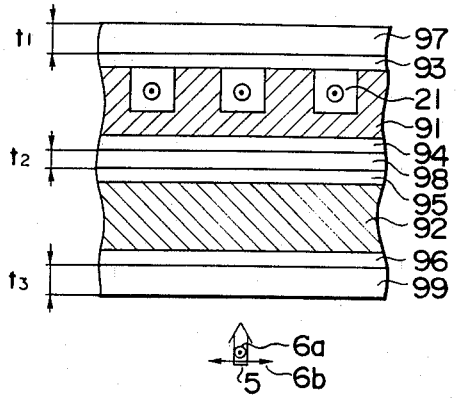
FIG. 17 is a schematic cross-section of one example of the display element having a laminate structure of a plurality of diffraction gratings in accordance with the present invention.
Figure 18:
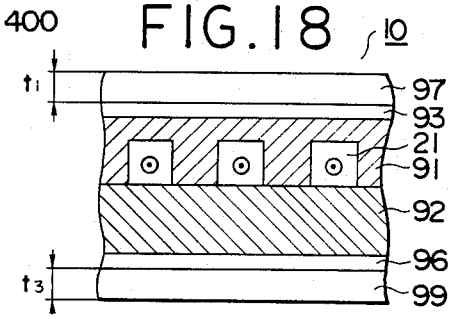
FIG. 18 is a schematic cross-section similar to FIG. 17 but showing another example of the display element.

As shown in FIGS. 17 and 18, the display element 10 may be constituted by laminating a plurality of light modulating layers including a diffraction grating and a liquid crystal.

FIG. 17 shows a third preferred embodiment of the display element 10 of the present invention. The display element 10 includes: the liquid crystal 21; diffraction gratings 91 and 92; optically transparent electrodes 93, 94, 95 and 96; and optically transparent substrates 97, 98 and 99. Incidentally the incident light indicated by 5 includes polarized components 6a and 6b which cross perpendicular to each other, and $t_1$, $t_2$ and $t_3$ respectively represent the thicknesses of the transparent substrates 97, 98 and 99.

The direction of the grating lines of the diffraction grating 91 crosses at right angles to the surface of the sheet (the polarized component 6a) while the direction of the grating lines of the diffraction grating 92 extends parallel with the surface of the sheet, in the horizontal direction as viewed in FIG. 17 (the polarized component 6b). The liquid crystal 21 is oriented in the direction of the grating lines of the diffraction gratings 91 and 92. As described above, the incident light 5 incident on the display element 10 includes the polarized component parallel with the direction of the grating lines (the polarized component 6b) of the diffraction grating 92, the polarized component 6b is diffracted by the difference in refractive index as between the diffraction grating 92 (refractive index $n_g$) and the liquid crystal 21 (refractive index $n_e$). After a portion of the diffracted light has been reflected, it passes through the transparent electrode 96, and is totally reflected by the boundary of the transparent substrate 99 and air. The size of the area of the diffraction grating is limited by the thickness $t_3$ of the transparent substrate 99. Since the thickness of the transparent electrode 96 is far smaller than that of the transparent substrate 99, it may be ignored.

On the other hand, a portion of the transmitted diffracted light reaches the diffraction grating 91 through the transparent electrode 95, the transparent substrate 98 and the transparent electrode 94. The refractive index $n_g$ of the diffraction grating 91 and the refractive index $n_0$ of the liquid crystal 21 are set to be equal to each other with respect to the transmitted diffracted light (the polarized component 6b). Therefore, the transmitted diffracted light passes in a non-modulated state through the transparent electrode 93 and reaches the surface of the transparent substrate 97. Part of the transmitted diffracted light is totally reflected by the boundary of the transparent substrate 97 and air, passed through the transparent electrode 93, the diffraction grating 91, the transparent electrode 94, the transparent substrate 98 and the transparent electrode 95, and reaching the diffraction grating 92. The size of the area of the diffraction grating which forms a display pattern is limited by the sum of the thicknesses ($t_1 + t_2$) of the transparent substrates 98 and 97.

Since the thicknesses of the transparent electrodes 93, 94 and 95 are far smaller than those of the transparent substrates 97 and 98, it may be ignored.

The size of the area of the diffraction grating with respect to the polarized component 6b of the incident light 5 is limited by the thinner one of the thickness $t_3$ of the transparent substrate and the sum ($t_1 + t_2$).

The above description is applied to the case of the polarized component 6a of the incident light 5. The incident light 5 which is incident on the display element 10 (in the direction of the polarized component 6b) is diffracted on the basis of the difference between the refractive index $n_g$ of the diffraction grating 91 and the refractive index $n_e$ of the liquid crystal 21. The size of the area of the diffraction grating with respect to the transmitted diffracted light is limited by the thickness $t_1$ of the transparent substrate 97 while that with respect to the reflected diffracted light is limited by the sum of the thicknesses ($t_2 + t_3$) of the transparent substrates 98 and 99. Therefore, the size of the area of the diffraction grating which forms a display pattern with respect to the polarized component 6a of the incident light 5 is limited by the thickness of the thinner one of the thickness $t_1$ of the transparent substrate and the sum ($t_1 + t_2$).

Accordingly, the size of the area of the diffraction grating which forms a display pattern with respect to the incident light 5 is limited by the thinner one of the thicknesses t1 and t3 of the respective transparent substrates 97 and 99 by which total reflection is effected.

As described above, if the thickness t in the expression (5) or (7) is determined, it is possible to prevent the occurrence of a rainbow-like diffraction image which might become a problem when the display element 10 is employed.

FIG. 18 shows another modified form of the display element 10 shown in FIG. 17, and this modified form is constructed by omitting the transparent electrode and substrate which are sandwiched between the diffraction gratings 91 and 92 as shown in FIG. 17.

In FIG. 18, like reference numerals are used to denote like or corresponding constituent components which constitute each of the components shown in FIG. 17. The modified form of FIG. 18 is equivalent to a case where the thickness t2 of the transparent substrate 98 equals zero, but the basic operation is the same as that of the modified form shown in FIG. 17.

Figure 19:
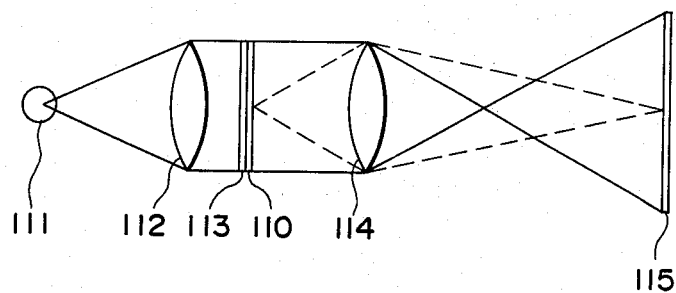
FIG. 19 is a diagrammatic illustration of another form of the observation apparatus in accordance with the present invention.

The presently preferred embodiment of the display element 10 is not limited to the viewfinder of a photographic camera such as that shown in FIG. 11. As shown in FIG. 19, the display element can be applied as a display light bulb to a portion of a given projection system.

The projection system shown in FIG. 19 includes a display element 110, a light source 111, a condenser lens 112, a translucent object 113 to be projected, a projecting lens 114 and a screen 115.

The light source 111 is disposed at the focal position of the condenser lens 112 for emitting illuminating light toward the condenser lens 112. The light emitted from the light source 111 is collimated into parallel light by the condenser lens 112, and illuminates at right angles to the translucent object 113 to be projected (for example, photographic film). The image on the translucent object 113 is formed on the screen 115 via the projection lens 114. The display element 110 according to the embodiment is disposed in the vicinity of the translucent object 113 in such a manner that the display state or the nondisplay state is selected by means of a driver unit (not shown). When the non-display state is selected, the display element 110 functions as an optically transparent body having a uniform refractive index all over the surface. Thus, the light transmitted through the translucent object 113 is not modulated to be formed on the screen 115 through the projection lens 114. When the display state is selected, a part of the light incident on the display element 110 is diffracted by a display pattern portion thereof constituted by a diffraction grating. Among the diffracted waves, the component having a large angle of diffraction is sent out of the pupil of the projection lens. Therefore, the operator visually feels as if the light transmitted through the translucent object 113 were subtracted, and an indication is provided in this state.

Figure 20:
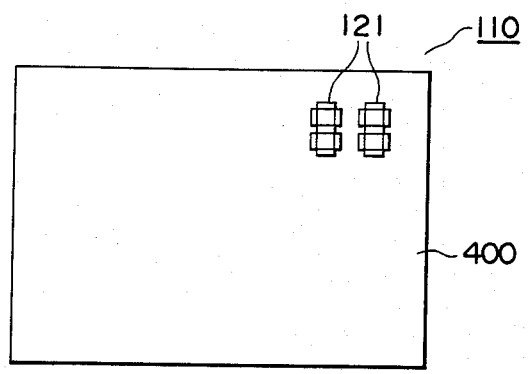
FIG. 20 is a top plan view of one example of the display element incorporated into the observation apparatus shown in FIG. 19.

FIG. 20 is a top plan view of the display element 110. Diffraction grating portions are indicated generally at 121 and an optically transparent substrate is indicated at 400. The fringes drawn within the diffraction grating portions 121 represent the direction of the respective diffraction grating lines. The directions of the grating lines of the respective diffraction grating portions 121 are parallel with the longitudinal directions of the respective grating areas (display pattern). Of the light incident on the display element 110, the light incident on the diffraction grating portions 121 is diffracted at an angle of diffraction which fulfills the following equation:

$$\phi = \sin^{-1}\left(\frac{m}{n} \cdot \frac{\lambda}{p}\right)$$

where m is the diffraction order, $\lambda$ being the wavelength of the illuminating light, n being the refractive index of the transparent substrate 400 and P being the pitch of the diffraction grating.

Low diffracted order light having a small angle of diffraction is formed on the screen through the projection lens 114. On the other hand, since light having a large angle of diffraction is sent out of the pupil of the projection lens 114, it does not contribute to image formation. High diffracted order light having a larger angle of diffraction is totally reflected by the boundary of the transparent substrate 4 and air. If any diffraction grating portion exits in the direction of advancement of the high diffracted order light which has been totally reflected, the same rainbow-like diffraction image as mentioned previously is generated at a position determined by the angle of diffraction of the diffracted light and the thickness of the transparent substrate 4.

Accordingly, if the shape of the diffraction grating portion is specified in the same manner as described previously, it is possible to prevent the occurrence of the rainbow-like diffraction image.

As described above, in a conventional type of display element, the light diffracted by the diffraction grating portion is totally reflected by another surface having no diffraction grating portion, the totally-reflected diffracted light being again incident on the same diffraction grating portion, thus leading to the problem that a rainbow-like diffraction image is produced. However, in the respective embodiments, if the geometry of the grating lines of the diffraction grating portion which forms a display pattern is specified in the aforementioned manner, it is possible to achieve a display element of the type which can prevent the occurrence of a rainbow-like diffraction image, thereby enabling a high quality display.

From the numerical viewpoint, if the width w of a display pattern in the direction normal to the grating lines is set to $w \leq 5$ mm, the aforesaid effect is enabled. In a case where the present invention is applied, for example, to the viewfinder of a photographic camera which requires critical specifications and extremely high display quality, $w \leq 2$ mm is recommended.

Figure 21:
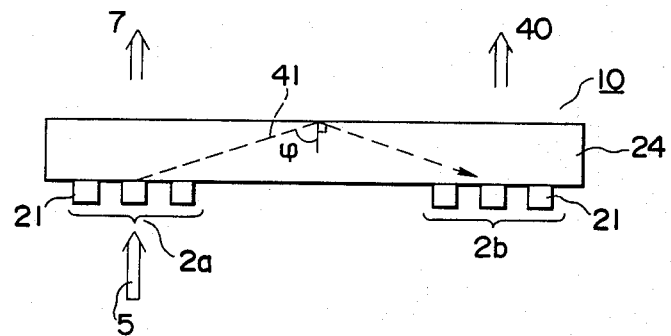
FIG. 21 is a schematic view used as an aid in explaining a zero or higher order light diffracted by a particular portion of a diffraction grating which forms a different display pattern.

When high intensity light is incident on the diffraction grating portion of the display element 10 depicted in the respective embodiments, a rainbow-like diffraction image is produced at another diffraction grating portion, causing a lowering of the characteristics of the element 10. FIG. 21 schematically shows the main cause of the phenomenon.

In FIG. 21, reference numeral 21 denotes an optically transparent diffraction grating member; 24 an optically transparent substrate; 5 incident light; and 7 transmitted light. For the sake of simplicity and by way of example, FIG. 21 shows given two diffraction grating portions 2a and 2b from among a plurality of diffraction grating portions.

The incident light 5 is incident at a right angle to the diffraction grating portion 2a, and is optically modulated in accordance with the difference in refractive index between a diffraction grating member 2 and air. At this time, the incident light 5 is diffracted into a plurality of diffracted order waves in the plane perpendicular to the direction of the grating lines of the diffraction grating member 2. Since the transmitted light 7 such as zero or relatively low diffracted order light has a relatively small angle of diffraction, it directly exits from the transparent substrate 24. However, if the angle of diffraction φ of higher diffracted order light exceeds the critical angle which is made by the transparent substrate 24 with air, the higher diffracted order light is totally reflected by the boundary of the transparent substrate 24 and air. The totally-reflected light might be made incident on the diffraction grating portion 2b. The light incident on the diffraction grating portion 2b is again diffracted, and diffracted light 40 which is a portion of the re-diffracted light exits from the transparent substrate 4 at a certain angle of diffraction. The outgoing light enters the entrance pupil of the observation system such as the viewfinder shown in FIG. 11 and the pupil of the operator, thereby forming a visual image. In this case, since the angle of diffraction φ of the high diffracted order light which has been diffracted by the diffraction grating portion 2a depends on the wavelength, the incidence position on the diffraction grating portion 2b depends on the wavelength, the dislocation of such a position forms a rainbow-like image which might be observed by the operator.

Figure 22:
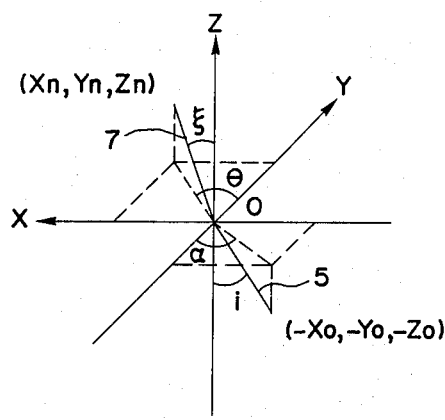
FIG. 22 is a chart showing the relationship between the light incident upon the diffraction grating and the direction of exit of the light diffracted by the diffraction grating.

FIG. 22 is a graph showing the relationship between the direction of incidence of the light incident on the diffraction grating portion and the direction of exit of the diffracted light. In FIG. 22, $(x_0, y_0, z_0)$ is the direction cosine of the incident light 5 which is incident on the diffraction grating portion while $(x_n, y_n, z_n)$ is the direction cosine of n-diffracted order light 7. i is the angle made by the z axis with incident light 5 (angle of incidence); α is the angle which is made by the y axis with the projection component of the incident light 5 which is projected onto the x - y plane, a so-called azimuth; ξ is the angle (angle of diffraction) which is made by the z axis with the transmitted diffracted light 7; and θ is the angle (azimuth) which is made by the y axis with the projection component of the transmitted diffracted light 7 which is projected onto the x - y plane. A diffraction grating portion (not shown) is formed in such a manner that its grating lines are parallel with the x axis within the x-y plane.

Between the incident light $(x_0, y_0, z_0)$ and the diffracted light $(x_n, y_n, z_n)$, the following relations are established:

$$x_n = x$$

$$y_n = y + n\frac{\lambda}{P}$$

$$z_n = \sqrt{1 - x_n^2 - y_n^2}$$

where n is the diffraction order, λ being the wavelength of light, and P being the period of the diffraction grating.

When i represents the angle of incidence of luminous flux from an illuminating system which is incident upon the diffraction grating portion of the display element, if the direction cosine of the incident light is (sin i·sin α, sin i·cos α, cos i), the azimuth θ of the diffracted light in the x - y plane is represented by:

$$|\theta| = \tan^{-1}\left(\frac{\sin i \cdot \sin \alpha}{\sin i \cdot \cos \alpha + k\frac{\lambda}{P}}\right) \quad (8)$$

where α is the real number which satisfies 0<α<90 degrees; and k is the diffraction order and the integer which satisfies:

$$\sin^{-1}(1/n) \leq \cos^{-1}\left(\sqrt{n^2 - (\sin i \cdot \sin \alpha)^2 - \left(\sin i \cdot \cos \alpha + k\frac{\lambda}{P}\right)^2}\Big/n\right) < 90[\deg] \quad (9)$$

In the above-described embodiment, the other diffracting grating portion is not set inside of the area having a angle within the azimuth θ required from the relation (8), that is, set outside angular range of the azimuth θ of relation (8), so that the rainbow-like diffracting image is not produced in the display pattern. If this condition is not satisfied, the diffracted light occurring in the other diffracting grating portion enters into the certain diffracting grating portion. Thereby, sometimes, the rainbow-like diffracting image occurs. In other words, in principle, the other diffracting grating portion is not present on the prolonged line which is perpendicular to the grating line of the certain diffracting grating portion, so as to be effectual.

Figure 23:
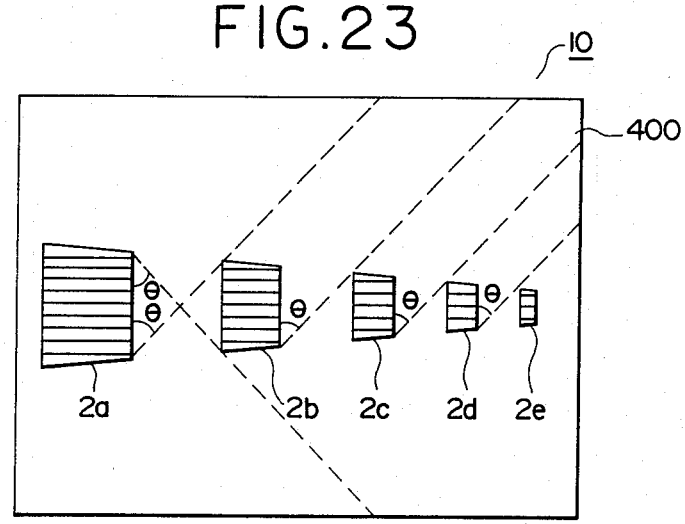
FIG. 23 is another example of the display element incorporated in the observation apparatus shown in FIG. 11.

FIG. 23 shows the explanatory view of a part of the display element 10 disposed in the vicinity of the pintplate 32 in the camera finder system shown in FIG. 11.

The respective diffraction grating portions 2a to 2e have a trapezoidal shape and are formed on the transparent substrate 400 at certain intervals, thereby display a wedge-like bar graph. The layout of each of the diffraction grating portions is determined in accordance with the azimuth θ of the diffracted light which advance from the diffraction grating portion into the surface of the substrate 400, and in order to fulfill the relation (8), one diffraction grating portions are disposed outside the angular range of ±θ with respect to the direction normal to the grating lines of the other diffraction grating portions. Specifically, if the respective diffraction grating portions are arranged in such a manner as to fulfill the relation (8), even if light is incident upon any location of the diffraction gration portion 2a, the diffracted light exiting from the diffraction grating portion 2a is prevent from being again diffracted by another diffraction grating portion, so that no rainbow-like diffraction image is produced. This is because no other diffraction grating portion is present within the angular range of ±θ with respect the direction normal to the grating lines of the diffraction grating portion 2a.

The above description is applied to the other diffraction grating portions 2b, 2c, 2d and 2e. Since no other diffraction grating portion is present within the angular range of ±θ with respect to the direction normal to the grating lines of the respective diffraction grating portion, no rainbow-like diffraction image is produced by the diffracted light exiting from the respective diffraction grating portions.

The angle of diffraction $\theta$ is determined by the angle of incidence i, the wavelength $\lambda$, and the diffraction grating period P of the light which is incident on the display element from the illuminating system. In the optical system of a photographic camera, if the angle of incidence i=20 degrees, the wavelength $\lambda=0.55$ μm, the diffraction grating period P=2.0 μm and the refractive index of the substrate n=1.5, then:

$$\theta \approx 17.3 \text{ degrees}$$

Figure 24:
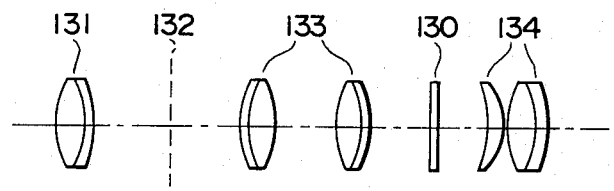
FIG. 24 is a schematic illustration of another example of the observation apparatus in accordance with the present invention and showing the viewfinder optical system of a video camera.

FIG. 24 schematically shows the optical arrangement of one example of an observation apparatus in which a display element is incorporated into the viewfinder optical system of a video camera. The optical arrangement shown includes a light modulating element 130, an objective lens 131, a first focusing plane 132, lens 133 and an eyepiece lens 134. The objective lens 131 and the lens 133 constitutes an illumination system for the observation apparatus in combination with a photographic lens, a semitransparent mirror and a reflection mirror which are (not shown) while the eyepiece lens 134 constitutes an observation system. Part of the object light transmitted through the photographic lens (not shown) is conducted into a viewfinder optical system through the photographic lens (not shown), passing through the objective lens 131, and focused on the first focusing plane 132. The light scattered from the first focusing plane 132 is focused through the lens 133 on the display element 130 disposed at the second focusing plane. Subsequently, the transmitted light through the display element 130 reaches the operator's eye through the eyepiece lens 134.

Although the display element 130 employed may be a simple phase type or amplitude type diffraction grating, it is preferable to use a phase type diffraction grating such as that shown in FIG. 2 the phase difference of which is variable. In this case, since the display state or the non-display state can be freely selected, a remarkably useful observation apparatus can be achieved.

The display element 130 constituting one embodiment shown in FIG. 24 is formed so as to select the display state or the non-display state by a driver unit (not shown). When the non-display state is selected, the display element 130 functions as an optically transparent substrate having a uniform refractive index all over the surface. Therefore, the image of an object formed on the second focusing plane is not modulated to be formed on the retina of the operator's eye through the eyepiece lens 134. When the display state is selected, part of the light incident on the display element 130 is diffracted by the display pattern portion including the diffraction grating. From among the thus-diffracted waves, the component having a large angle of diffraction is sent out of the visual field of the eye; accordingly, the operator feels as if the intensity of the object light were partially reduced, so that the display pattern is optically superimposed on the image of the object.

Figure 25:
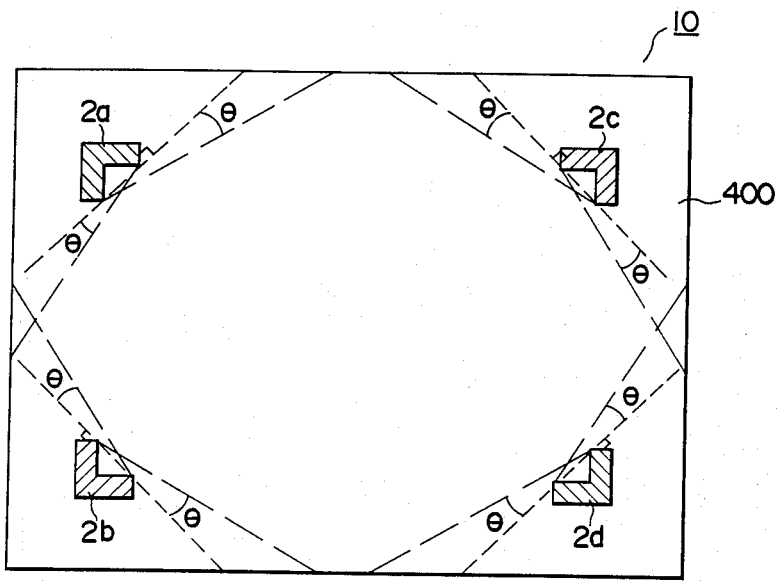
FIG. 25 is a top plan view of another embodiment of the display element incorporated into the observation apparatus in accordance with the present invention which is applied, for example, to the observation apparatuses shown in FIGS. 11 and 24.

FIG. 25 shows one example of the display element 130 constituting the presently preferred embodiment. Diffractive grating portions are indicated by 2a, 2b, 2c and 2d and an optically transparent substrate are indicated by 400. The fringe-like slanting lines within the respective diffraction grating portions represent the grating lines.

The respective grating portions have a L-like shape and are disposed within the optically transparent substrate 400 so s to display a frame for defining the visual field of the viewfinder.

The layout of each of the diffraction grating portions is determined in accordance with the azimuth $\theta$ of the diffracted light which advances from the diffraction grating portion into the surface of the substrate 400, and in accordance with the relation (8), no other diffraction grating portion is disposed within the angular range of $\pm\theta$ with respect to the direction normal to the grating lines of one diffraction grating portion.

Even if light is incident upon any location of the diffraction grating portion 2a, since no other diffraction grating portion is present within the angular range of $\pm\theta$ with respect the direction normal to the grating lines of the diffraction grating portion 2a, no rainbow-like diffracted light is produced by the diffracted light exiting from the diffraction grating portion 2a.

The above description is applied to the other diffraction grating portions 2b, 2c, 2d and 2e. Since no other diffraction grating portion is present within the angular range of $\pm\theta$ with respect to the direction normal to the grating lines of the respective diffraction grating portions, no rainbow-like diffraction image is produced by the diffracted light exiting from the respective diffraction grating portions.

The azimuth $\theta$ is determined by the angle of incidence i, the wavelength $\lambda$, and the diffraction grating period P of the light which is incident on the light modulating element from the illuminating system. In the optical system of a video camera, if the angle of incidence i=5 degrees, the wavelength $\lambda=0.55$ μm, the diffraction grating period P=2.0 μm and the refractive index of the substrate n=1.5, then:

$$\theta \approx 4.5 \text{ degrees}$$

As described above, when the incident light is diffracted by the diffraction grating portion, the diffracted light is totally reflected by another surface having no diffraction grating portion. This totally reflected light is incident on another diffraction grating portion, thereby producing a rainbow-like diffraction image. However, in the presently preferred embodiments, the layout of a plurality of diffraction grating portions which form a display pattern is specified in such a manner that no other diffraction grating portion is present within the angular range of the angle $\theta$ with respect to the direction normal to the grating lines of the respective diffraction grating portions in which the angle $\theta$ satisfies the equation (8). Accordingly, it is possible to achieve the observation apparatus incorporating the display element which succeeds in preventing the occurrence of such a rainbow-like image, and yet which enables a high quality display image.

Figure 26:
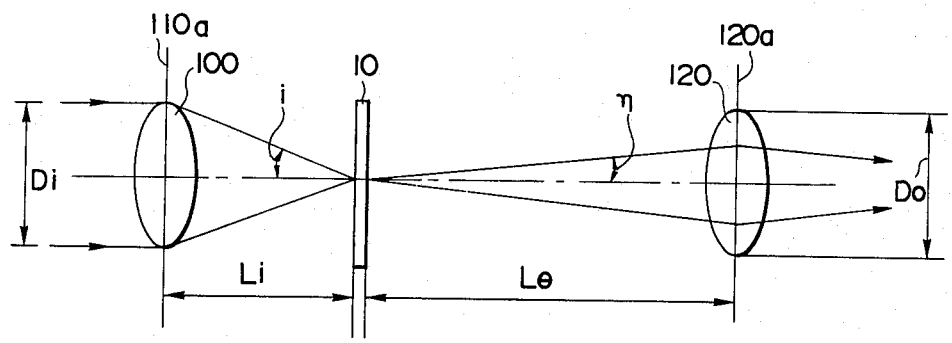
FIG. 26 is a diagrammatic view used as an aid in explaining a further embodiment of the observation apparatus in accordance with the present invention.

FIG. 26 is a diagram of an optical system and showing the third preferred embodiment of the present invention. In FIG. 26, an illuminating system is indicated by 100, corresponding to, for example, the photographing system of a camera. A display element and an observation system are respectively indicated by 10 and 120, corresponding to, for example, the viewfinder system of the camera. Reference numerals 100 and 120 denote pupil planes.

$D_i$ and $D_0$ are the diameters of the pupils of the illumination system 100 and the observation system 120, respectively, $L_i$ being the distance between the pupil plane of the illumination system 100 and the display element 10, $L_o$ being the distance between the display element 10 and the pupil plane of the observation system 120, i being the angle of incidence of the light which is incident on the display element 10 and $\eta$ being an angular aperture of the observation system 120, in this case $\eta = \tan^{-1}(D_0/2L_0)$.

A plurality of diffraction grating portions constituting the display element 10 may be a type including a normal phase or amplitude type diffraction grating, or an active phase type diffraction grating as shown in FIG. 2 in which the transmission and nontransmission of zero diffracted order light can be freely controlled.

Referring back to FIGS. 21 and 22, when light is incident on the first diffraction grating 2a present in the direction of −y with respect to the origin 0, if the direction cosine $(x_0, y_0, z_0)$ of the incident light is (0, sin i, cos i), part of the light diffracted by the first diffraction grating 29 is totally reflected by the boundary of the transparent substrate 400 and the resultant light 41 is incident on the second diffraction grating 2b, resulting in the production of the diffracted light 40. On the basis of the aforesaid relation between $(x_0, y_0, z_0)$ and $(x_n, y_n, z_n)$, the angle of diffraction $\xi$ of the diffracted light is:

$$\xi = \cos^{-1}\left(\sqrt{1 - \left(m \cdot \frac{\lambda}{P} \cdot \sin\theta\right)^2 - \left(\sin i + \frac{\lambda}{P} \cdot (k + m \cdot \cos\theta)\right)^2}\right) \quad (10)$$

where $\theta$ is the angle which is made by the direction of the grating lines of the first diffraction grating portion 2a and that of the grating lines of the second diffraction line portion 2b, k being the diffraction order of the light diffracted by the first diffraction grating portion 2a and m being the diffraction order of the light diffracted by the second diffraction grating portion 2b, the following requirements are satisfied:

$$\sin^{-1}(1/n) \leq \cos^{-1}\left(\sqrt{1 - \left(\sin i + k\frac{\lambda}{P}\right)^2}/n^2\right) < \frac{\pi}{2} \quad (11)$$

$$0 \leq \cos^{-1}\left(\sqrt{1 - \left(\frac{m}{n}\frac{\lambda}{p}\sin\theta\right)^2 - \left(\sin i + \frac{\lambda}{P}(k + m \cdot \cos\theta)\right)^2}/n^2\right) < \sin^{-1}(1/n) \quad (12)$$

where n is the refractive index of the substrates 24 including the respective diffraction grating portions.

Referring back to FIG. 26, when $D_\theta$ is the diameter of the pupil of the observation system 120, $L_\theta$ being the distance between the display element 10 and the plane of the pupil of the observation system 120, $\eta$ of the angular aperture of the observation system 120 becomes $\eta = \tan^{-1}(D_\theta/2L_{74})$. Therefore, the angle $\theta$ ($\theta$: the angle which is made by the direction of the grating lines of the first diffraction grating portion with that of the grating lines of the second diffraction grating portion) is preferably set so that the angle of diffraction $\xi$ of the light diffracted by the second diffraction grating portion 2b fulfills the following requirement:

$$\xi > \tan^{-1}(D_\theta/2L_\theta) \quad (13)$$

In consequence, since unwanted diffracted light is sent out of the pupil of the observation system, no rainbow-like diffraction image can be observed.

As described above, when the incident light 5 is incident on the diffraction grating portion 2a, the diffracted waves of the light 5 is totally reflected by another surface having no diffraction grating portion 2a, for example, a surface of the transparent substrate 24 adjacent to air. Subsequently, when the reflected light is incident on the area of the diffraction grating portion 2b, the thus-diffracted light might enter the entrance pupil of the observation system. For this reason, in the presently preferred embodiment, the angle $\theta$ which is made by the grating lines of the diffraction grating portion 2a and that of the diffraction grating portion 2b is set to satisfy the aforesaid expression (13), so that the aforesaid diffracted light is substantially prevented from entering the entrance pupil of the observation system, thereby precluding a rainbow-like image produced by the diffraction grating portion 2b from reaching the operator's eye.

Similar to the aforementioned case, if light is incident on the diffraction grating portion 2b, the thus-diffracted light is totally reflected and might be incident on another diffraction grating portion 2a. However, even if such a phenomenon occurs, the light diffracted by the portion 2a is substantially prevented from entering the entrance pupil of the observation system.

Although the above description deals with transmitted diffracted light by way of example, the case of reflected diffracted light is also completely the same.

The display element 10 including a plurality of diffraction grating structures which satisfy the aforesaid relationship is constructed as shown in FIG. 2, and is in turn incorporated into the viewfinder system of the camera shown in FIG. 11.

Considering again FIG. 11, when the non-display state is selected, the display element 10 serves as an optically transparent substrate having a uniform refractive index all over the surface thereof. Therefore, the image of an object focused on the focal plane is not optically modulated, and is formed on the eye's retina via the condenser lens 33 and the pentaprism 34 and the eyepiece lens 35 in the original form. On the other hand, when the display state is selected, a portion of the light incident on the display element 10 is diffracted by the display pattern portion constituted by the diffraction grating line portion. Among the diffracted light, the component of a larger angle of diffraction is sent out of the visual field of the operator's eye. Therefore, the operator visually feels that a portion of the light from an object is substracted, so that the display pattern is optically superimposed on the image of an object.

In the optical system of the camera, when luminous flux is incident on the display element 10 from the illumination system constituted by the image forming optical system 36, the quick return mirror 31 and the focusing screen 32, if i=20 degrees (i: incident angle), λ=0.55 μm (λ: wavelength), P=1.5 μm (P: diffraction grating period), n=1.5 (n: the refractive index of the transparent substrate of the display element 10) and η=3 degrees (η: the angular aperture of the observation system), from the expressions (10) to (13) we have:

$$\theta \geq 18 \text{ degrees}$$

When light is incident on and diffracted by a given diffraction grating portion, it is totally reflected by another surface having no diffraction grating portion, for example, a surface of the transparent substrate adjacent to air. Subsequently, the reflected light is incident on another diffraction grating portion. However, if the angle θ made by the grating lines of given two diffraction grating portions with each other is set to $\theta \geq 18$ degrees, the diffracted light does not substantially enter the entrance pupil of the observation system, thereby eliminating the occurrence of a rainbow-like image.

Figure 27:
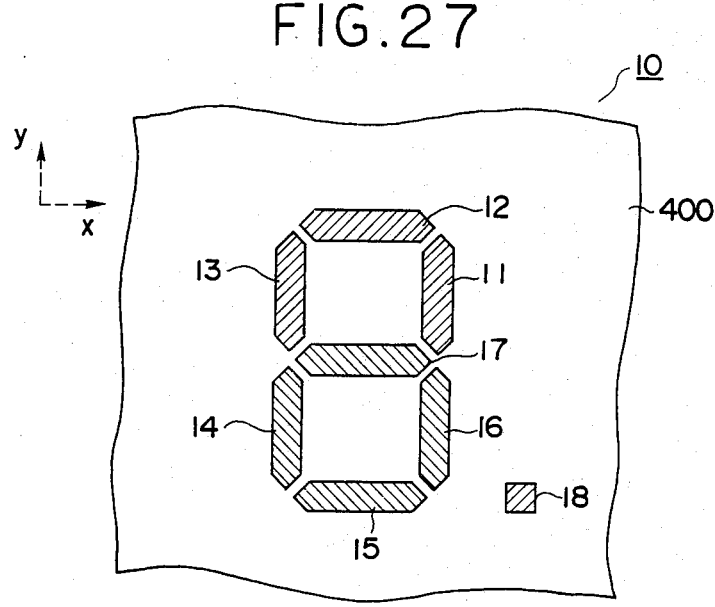
FIG. 27 is another example of the display element incorporated into the observation apparatus shown in FIG. 11.
Figure 28:
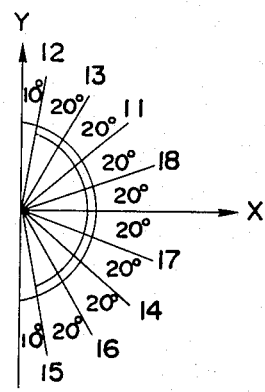
FIG. 28 is a chart used as an aid in explaining the directions of the grating lines of the diffraction gratings of the respective segments which form the display element shown in FIG. 27.

FIG. 27 is an enlarged top plan view of the display element 10 constituting the presently preferred embodiment shown in FIG. 11 with FIG. 28 being an azimuth chart of the direction of the grating lines.

In FIG. 27, the transparent substrate 400 includes diffraction grating portions 11, 12, 13, 14, 15, 16, 17 and 18 and the directions of the slanting lines within the respective diffraction grating portions represent the directions of the respective grating lines. In FIG. 28, reference numerals 11, 12, 13, 14, 15, 16, 17 and 18 respectively represent the directions of the grating lines of the respective diffraction grating portions 11 to 18, and the respective directions of the grating lines intersect at an angle of 20° or more.

The display pattern of the display element 10 is constituted by eight segments each forming one diffraction grating portion. Each of the eight segments has a different direction of the grating lines, and the angle θ which is made by the grating lines of the respective grating portions with one another is $\theta \geq 20°$. When light is incident on and diffracted by a given diffraction grating portion, it is totally reflected by another surface having no diffraction grating portion, for example, a surface of the transparent substrate adjacent to air. Subsequently, the reflected light is incident on another diffraction grating portion. However, since the unwanted diffracted light is sent out of the pupil of the observation system, no rainbow-like diffraction image is produced, thereby preventing the degradation of display quality.

The display element such as that shown in FIG. 27 is suitable for the viewfinder of the video camera shown in FIG. 24 as well as the viewfinder of a single lens reflex camera.

In the optical system of a typical video camera, as shown in FIG. 24, in a case where the display element 130 is disposed on the second focal plane of the optical viewfinder, luminous flux is made incident on the display element 130 by the illuminating system constituted by the photographic lens (not shown), the semitransparent mirror (not shown), the reflecting mirror (not shown), the objective lens 131 and the lens 133. In this case, the maximum incident angle of incident flux is about 5 degrees while the angular aperture of the eyepiece lens 134 constituting the observation system is η=6 degrees. If λ=0.55 μm (λ: wavelength of incident light), P=1.5 μm (P: diffraction grating period) and n=1.5 (n: refractive index of the transparent substrate of the light modulating element 30), from the expressions (10) to (13), we have:

$$\theta \geq 10 \text{ degrees}$$

In the display element having a plurality of diffraction grating portions formed in accordance with a display pattern, when light is incident on and diffracted by given two diffraction grating portions, it is totally reflected by another surface having no diffraction grating portion, for example, a surface of the transparent substrate adjacent to air. Subsequently, the reflected light might be incident on another diffraction grating portion. However, since the unwanted diffracted light is sent out of the pupil of the observation system, no rainbow-like diffraction image is produced, thereby preventing degradation of display quality.

As described above, in accordance with the present invention, if the angle formed between a plurality of grating lines of the diffraction grating portions which forms a display pattern is specified to satisfy the aforesaid expressions (10) to (13), it is possible to achieve the observation apparatus employing a display element which enables a high quality display by eliminating the phenomenon in which the light diffracted by a given diffraction grating portion is totally reflected by another surface having not diffraction grating portion, being incident on another diffraction grating portion, and thereby forming a rainbow-like diffraction image in the observation system.

As is evident from the foregoing, in accordance with the present invention, the width of a particular direction of the display pattern formed by the diffraction grating which constitutes the display element, the direction of the grating lines of the diffraction grating, the arrangement of the diffraction grating (for example, an arrangement including a plurality of diffraction gratings) or the like is suitably specified to thereby prevent or reduce the occurrence of a rainbow-like image or a diffraction image or prevent such image from being observed by the operator, so that high quality display is achieved.

In addition, the layout of a plurality of diffraction grating structures which constitutes the display element, for example, the direction of the respective grating lines or the positional relationship therebetween is suitably specified to thereby prevent or reduce the occurrence of a rainbow-like image or a diffraction image due to re-diffracted light or prevent the re-diffracted light from entering the pupil of the observation system, so that a high quality display is achieved.

It will be understood that the foregoing disclosure of preferred embodiments of the present invention is for purposes of illustration only, and that various types of display elements and observation apparatuses may be provided without involving any departure from the spirit and scope of the invention as defined by the claims defined in the appended claims.

What we claim is:

1. A display element comprising:
   a substrate; and
   a display pattern formed on said substrate, said display pattern including a diffraction grating,
   wherein the width in the direction perpendicular to grating lines of said diffraction grating is selected so as to prevent rediffraction of the light diffracted by said diffraction grating.

2. A display element according to claim 1, wherein, when t represents the thickness of said substrate, n representing the refractive index of the same and w representing the width of said display pattern, w fulfills the following requirement:

$$w < 4 \times t \times \tan\{\sin^{-1}(1/n)\}.$$

3. A display element according to claim 1, wherein said width w is:

$$w < 5 \text{ mm}.$$

4. A display element according to claim 3, wherein said width w is:

$$w < 2 \text{ mm}.$$

5. A display element according to claim 1, wherein the direction of said grating lines is inclined with respect to the longitudinal direction of said display pattern.

6. A display element according to claim 1, wherein said diffraction grating comprises:

a relief pattern formed on said substrate, said relief pattern having a periodical grating portion; and a liquid crystal sealed in said grating portion of said relief pattern, said liquid crystal having a variable refractive index, and said display element further including means for controlling said refractive index of said liquid crystal.

7. An observation apparatus comprising:

a display element including a substrate and first and second display patterns formed on said substrate, each of said display patterns having diffraction grating structures;

an illuminating system, having a pupil, for supplying light to said display element; and an observation system, having a pupil, disposed to allow for observation of the first and second display patterns produced by the light diffracted by said diffraction grating structures, wherein letting in denote the angle of incidence of light with respect to said substrate, $D_1$ the diameter of said pupil of said illuminating system, $D_0$ the diameter of said pupil of said observation system, $L_i$ the distance between said substrate and the plane of said pupil of said illuminating system, $L_0$ the distance between said substrate and the plane of said pupil of said observation system, $\lambda$ the wavelength of incident light, P the grating period of said diffraction grating structures of said first and second display patterns and n the refractive index of said substrate, the angle $\theta$ made by the grating lines of said diffraction grating structures of said first and second display patterns fulfills the requirement:

$$\sin^{-1}(1/n) \leq \cos^{-1}\left(\sqrt{1 - \left(\sin i + k\frac{\lambda}{p}\right)^2}/n_2\right) < \frac{\pi}{2}$$

$$0 < \cos^{-1}\left(\sqrt{1 - \left(\frac{m}{n}\frac{\lambda}{p}\sin\theta\right)^2 - \left(\sin i + \frac{\lambda}{p}(k + m\cos\theta)\right)^2}/n^2\right) \leq \frac{\pi}{2}$$

$$\tan^{-1}(D_0/2L_o) < \cos^{-1}\left(\sqrt{1 - \left(m\frac{\lambda}{p}\sin\theta\right)^2 - \left(\sin i + \frac{\lambda}{p}(k + m\cos\theta)\right)^2}\right)$$

(k, m; any integer)

8. An observation apparatus according to claim 7, wherein said diffraction grating structure comprise:

a relief pattern formed on said substrate, said relief pattern having a periodical grating portion; and a liquid crystal sealed in said grating portion of said relief pattern, said liquid crystal having a variable refractive index, and said observation apparatus further including means for controlling said refractive index of said liquid crystal.

9. An observation apparatus according to claim 7, wherein said diffraction grating comprises:

a relief pattern formed on said substrate, said relief pattern having a periodical grating portion; and a liquid crystal sealed in said grating portion of said relief pattern, said liquid crystal having a variable refractive index, and said display element having means for controlling said refractive index of said liquid crystal.

10. An observation apparatus according to claim 7, wherein said illuminating system is formed by an objective lens for forming an image of an object to be observed in the vicinity of said display element, and said first and second display patterns and the image of the object being observed by said observation system.

11. An observation apparatus comprising:

a display element including a substrate and first and second display patterns formed on said substrate, each of said display patterns having diffraction grating structures;

an illuminating system for supplying light to said display element; and an observation system disposed to allow for observation of the first and second display patterns produced by the light diffracted by said diffraction grating structure, wherein letting i denote the angle of incidence of light with respect to said substrate, $\lambda$ the wavelength of incident light, P the grating period of said diffraction grating structures, K the diffraction order of the light diffracted by said diffraction grating structures, and $\theta$ the offset angle from the direction perpendicular to the grating line of one of said diffraction grating structures, the other diffraction grating structures being located outside the angular range of $\pm\theta$ degrees which satisfies $$\sin^{-1}(1/n) \leq \cos^{-1}\left(\sqrt{n^2 - (\sin i + \sin \alpha)^2 - \left(\sin i \cdot \cos \alpha + k\frac{\lambda}{p}\right)^2} \Big/ n\right) < 90 \text{ degrees}$$

$$|\theta| \leq \tan^{-1}\left(\frac{\sin i \cdot \sin \alpha}{\sin i \cdot \cos \alpha + k\frac{\lambda}{p}}\right) \text{degrees}$$

$0 \leq \alpha \leq 90$ degrees ($\alpha$; any integer).

12. An observation apparatus according to claim 11, wherein said illuminating system is formed by an objective lens for forming an image of an object to be observed in the vicinity of said display element, and said first and second display patterns and the image of the object being observed by said observation system.

* * * * *

UNITED STATES PATENT AND TRADEMARK OFFICE
CERTIFICATE OF CORRECTION

PATENT NO. : 4,856,869

DATED : August 15, 1989

INVENTOR(S) : Sakata, et al.

It is certified that error appears in the above-identified patent and that said Letters Patent is hereby corrected as shown below:

On the Title Page, Item [75]

Change "Akihiro" to read --Akihiko--.

COLUMN 5:

Line 32, change "substractive" to read --subtractive--.

COLUMN 6:

Line 32, change "g rating" to read --grating--.

COLUMN 8:

Line 29, change "exit" to read --exits--.

COLUMN 9:

Line 38, after "1.5$\mu$m" (second occurrence) insert --and a ratio--.

Line 41, change "Rosch)," to read --Roshu),--.

COLUMN 10:

Line 46, delete "is".

UNITED STATES PATENT AND TRADEMARK OFFICE
CERTIFICATE OF CORRECTION

PATENT NO. : 4,856,869

DATED : August 15, 1989

INVENTOR(S) : Sakata, et al.

It is certified that error appears in the above-identified patent and that said Letters Patent is hereby corrected as shown below:

COLUMN 11:

Line 4, change "hights T" to read --heights T--.

Line 54, change "filed" to read --field--.

COLUMN 12:

Line 6, delete "not".

COLUMN 13:

Line 4, change ":he" to read --the--.

COLUMN 17:

Line 4, change "$\phi$ being" to read -- $\Psi$ being--.

Line 6, change "$\phi$ being" to read -- $\Psi$ being--.

Line 16, change "$\phi$" to read -- $\Psi$ --.

Line 18, change "($n \cdot \sin\phi > 1:n$" to read --($n \cdot \sin\Psi > 1:n$--.

Line 26, change "$\phi$" to read -- $\Psi$ --.

Line 29, change the equation to read -- $\ell \approx 2 \cdot t \cdot \tan \phi$ --.

UNITED STATES PATENT AND TRADEMARK OFFICE
CERTIFICATE OF CORRECTION

PATENT NO. : 4,856,869

DATED : August 15, 1989

INVENTOR(S) : Sakata, et al.

It is certified that error appears in the above-identified patent and that said Letters Patent is hereby corrected as shown below:

COLUMN 18:

Line 23, delete "a".

COLUMN 20:

Line 47, change "it" to read --they--.

COLUMN 22:

Line 7, change "$\phi$" to read -- $\Psi$ --.

COLUMN 23:

Line 12, change "$\phi$" to read -- $\Psi$ --.

Line 32, change "$\phi$" to read -- $\Psi$ --.

COLUMN 24:

Line 16, change "$0<a<90$" to read --$0\leq\alpha\leq 90$--.

Line 40, delete "pint".

Line 41, change "plate" to read --focusing screen--.

UNITED STATES PATENT AND TRADEMARK OFFICE
CERTIFICATE OF CORRECTION

PATENT NO. : 4,856,869

DATED : August 15, 1989

INVENTOR(S) : Sakata, et al.

It is certified that error appears in the above-identified patent and that said Letters Patent is hereby corrected as shown below:

COLUMN 24 continued:

Line 44, change "display" to read --displaying--.

Line 50, change "portions are" to read --portion is--.

Line 56, change "gration" to read --grating--.

COLUMN 26:

Line 3, change "so s" to read --so as--.

COLUMN 27:

Line 55, change "$2L_{74}$" to read --$2L_{\theta}$--.

COLUMN 30:

Line 57, delete "claims".

Line 58, delete "defined in the".

UNITED STATES PATENT AND TRADEMARK OFFICE
CERTIFICATE OF CORRECTION

PATENT NO. : 4,856,869

DATED : August 15, 1989

INVENTOR(S) : Sakata, et al.

It is certified that error appears in the above-identified patent and that said Letters Patent is hereby corrected as shown below:

COLUMN 32:

Line 5, change the formula to read in part $$-- \left( \sqrt{1 - (\sin + k \frac{\lambda}{P}) / n_2} \right) --.$$

Line 24, change "grating structure" to read --grating structures--.

Line 68, change "satisfies" to read --satisfies:--.

Signed and Sealed this

Sixteenth Day of April, 1991

Attest:

HARRY F. MANBECK, JR.

*Attesting Officer*  *Commissioner of Patents and Trademarks*